United States Patent
Torii et al.

(10) Patent No.: US 7,818,287 B2
(45) Date of Patent: Oct. 19, 2010

(54) STORAGE MANAGEMENT SYSTEM AND METHOD AND PROGRAM

(75) Inventors: Takashi Torii, Tokyo (JP); Satoshi Yamakawa, Tokyo (JP); Yoshihiro Kajiki, Tokyo (JP)

(73) Assignee: NEC Corporation, Tokyo (JP)

( * ) Notice: Subject to any disclaimer, the term of this patent is extended or adjusted under 35 U.S.C. 154(b) by 484 days.

(21) Appl. No.: 11/267,254

(22) Filed: Nov. 7, 2005

(65) Prior Publication Data

US 2006/0129537 A1     Jun. 15, 2006

(30) Foreign Application Priority Data

Nov. 12, 2004  (JP)  ............................. 2004-329209
Mar. 3, 2005   (JP)  ............................. 2005-059115

(51) Int. Cl.
  *G06F 17/30*  (2006.01)
  *G06F 13/00*  (2006.01)
(52) U.S. Cl. ....................................... 707/600; 711/173
(58) Field of Classification Search ..................... 707/3, 707/229, 1, 600; 711/173
See application file for complete search history.

(56) References Cited

U.S. PATENT DOCUMENTS

| | | | |
|---|---|---|---|
| 5,564,037 A * | 10/1996 | Lam | 711/161 |
| 6,278,678 B1 * | 8/2001 | Iida | 369/83 |
| 2003/0051117 A1 * | 3/2003 | Burch et al. | 711/173 |
| 2003/0097454 A1 | 5/2003 | Yamakawa et al. | |
| 2004/0133540 A1 * | 7/2004 | Saake et al. | 707/1 |
| 2004/0193760 A1 | 9/2004 | Matsunami et al. | |
| 2004/0215659 A1 * | 10/2004 | Singfield et al. | 707/104.1 |
| 2006/0206511 A1 | 9/2006 | Picon et al. | |

FOREIGN PATENT DOCUMENTS

| | | |
|---|---|---|
| CN | 1276569 | 12/2000 |
| EP | 1058199 | 12/2000 |
| JP | 2001-222450 | 8/2001 |
| JP | 2003-150435 | 5/2003 |

(Continued)

OTHER PUBLICATIONS

Torii et al, U.S. Appl. No. 11/267,254 explanation of document.

(Continued)

*Primary Examiner*—James Trujillo
*Assistant Examiner*—Amresh Singh
(74) *Attorney, Agent, or Firm*—Young & Thompson

(57) ABSTRACT

Disclosed is a storage management system including at least one client, a first server having a primary storage, a second server having a secondary storage, and an intermediate device logically arranged between the client and the first and second servers. The primary storage includes a stub file in which there is recorded the position information of the real file migrated from the primary storage to the secondary storage. The intermediate device exercises control so that, when a file access request of the primary storage of a first server, issued by the client, is received by the intermediate device, the intermediate device receives the file access request and, if the file to be accessed is a stub file, and the access request necessitates accessing to the real file, the intermediate device accesses the real file of the secondary storage using the information of the stub file to return a response.

3 Claims, 29 Drawing Sheets

FOREIGN PATENT DOCUMENTS

| | | |
|---|---|---|
| JP | 2003-203029 | 7/2003 |
| JP | 2004-295457 | 10/2004 |
| WO | WO 2004/008310 | 1/2004 |

OTHER PUBLICATIONS

Chinese Office Action with English Translation dated Sep. 28, 2007.
Japanese translation of Chinese Office Action dated Sep. 28, 2007.
Wataru Katsurashima et al., Design and Evaluation of CIFS Server Virtualization Method, The Institute of Electronics, Information and Communications Engineers, Technical Report of IEICE CPSY2003-18 (Aug. 2002), pp. 1-9.
Satoshi Yamakawa et al., NAS Switch: NFS Server Virtualization, The Institute of Electronics, Information and Communication Engineers, Technical Report of IEICE., CPSY2002-36 Aug. 2002, pp. 1-8.

* cited by examiner

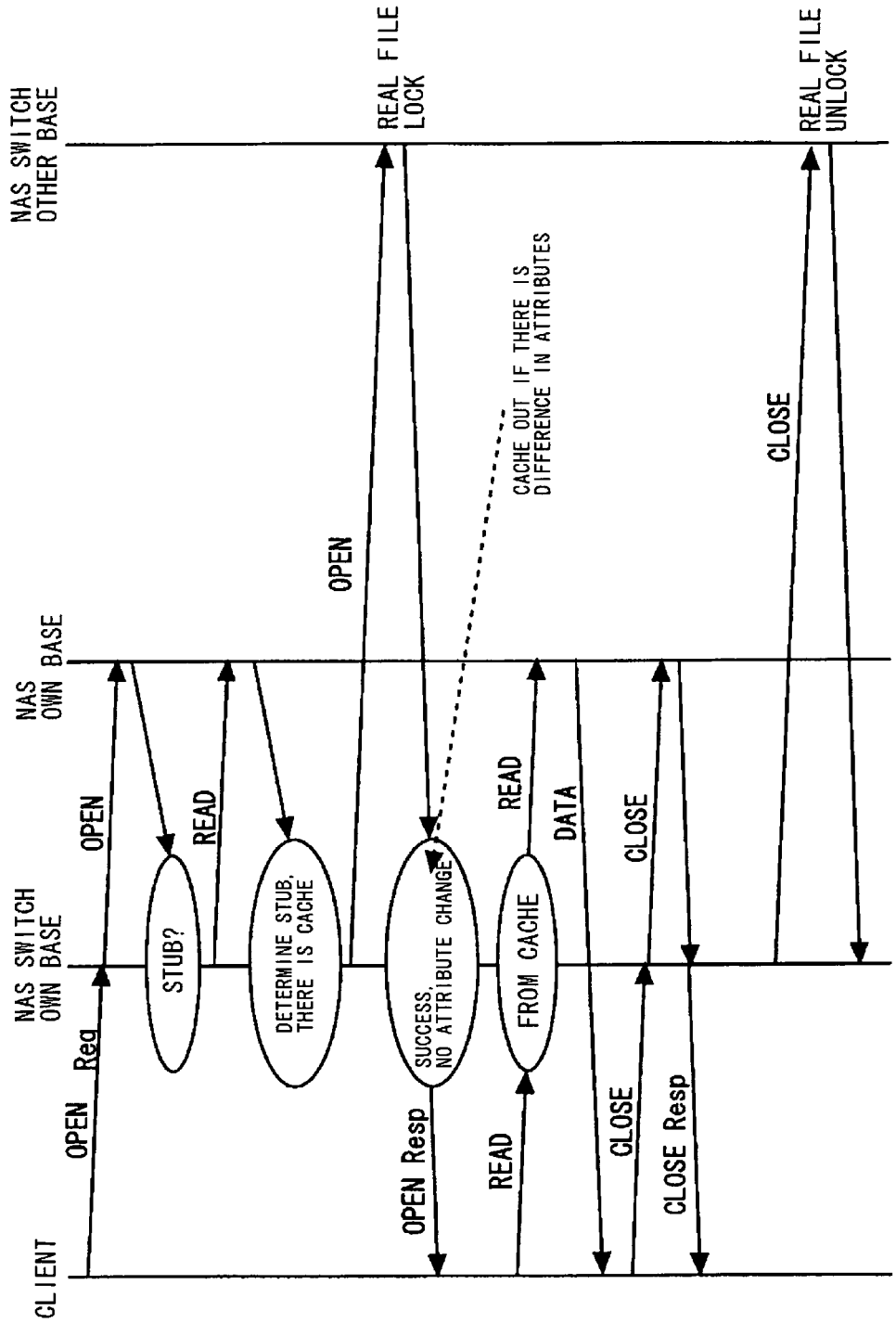

STORAGE MANAGEMENT SYSTEM AND METHOD AND PROGRAM

FIELD OF THE INVENTION

This invention relates to storage management technology and, more particularly, to a system and a method in which a logical intermediate unit is provided between a client and a file server, files are arranged between layers, and in which the layers are hidden from the client.

BACKGROUND OF THE INVENTION

In recent computer systems, the amount of data to be stored is increasing from year to year. Not only is the number of files increased, but the file size is increasing in e.g. moving picture data of the multimedia system. Consequently, there is a need for a larger data capacity and storage of higher speed. In business organizations or data centers, it is being attempted to increase the storage capacities in order to meet this demand. However, not all data stored in files are accessed, such that one-half or more of the entire data stored are not accessed whatsoever for the latest one year period or even longer.

This phenomenon is taken heed of in the hierarchical storage management (HSM) system in which frequently accessed data is saved in an expensive high-speed low-capacity storage and in which scarcely accessed data are saved in an inexpensive low-speed large-capacity storage.

If the amount of data is small, a system manager or supervisor is in a position to migrate data. However, in the up-to-date state of the art, when terabyte order storage is not uncommon, the storage capacity surpasses the level which would allow a supervisor or system manager to judge the degree of data criticality.

In HSM, data to be migrated is automatically selected from the frequency of access events by the client or from the file information to migrate the data from a high-speed storage to a low-speed storage.

Even when the data is migrated to the low-speed storage, the client is able to access the data, in the same way as before migration, even granting that he/she may feel that the accessing speed is slightly slow.

The conventional HSM system may roughly be classified into a host type system in which the HSM software is installed on the client side and a server type system in which the HSM is carried out on the server side.

In the system in which the HSM software is installed on the client side, the HSM in most cases is application-specified. As typical of this system is the E-mail software coping with HSM. In the case of an E-mail, a simple model that data criticality is decreased as the date becomes old, is more likely to hold and hence it may cope with HSM more readily. A mail with old date is automatically migrated to a secondary storage and a short-cut file is substituted for a mail file of the primary storage. In the short-cut file is stored a pathname of the file entity on the secondary storage.

When the client reads this file, the HSM-accommodating mail software reads out the contents of the short-cut file to access the secondary storage. Thus, the client does not have to be conscious that the file is in the secondary storage. Meanwhile, the 'short-cut file' is the name used in the Windows (registered trademark) and the corresponding name in the Unix (registered trademark) is 'symbolic link'.

With the shortcut file or the symbolic link, as used in this type of the software, the fact that the file entity has been migrated to the secondary storage cannot completely be hidden from the client.

If the processing is through the HSM-accommodating software, the size of the short-cut file, migrated to the secondary storage, is converted into the capacity of the file entity. However, insofar as the Explorer (registered trademark) of the Windows (registered trademark) is concerned, the file size appears as if it is a shortcut file with the file size of 1 kB.

If a file is to be deleted, the file entity of the secondary storage is deleted with the processing through the HSM-accommodating software. However, insofar as the Explorer (registered trademark) is concerned, it is only the short-cut file that is deleted, while the file entity of the secondary storage is not deleted.

Meanwhile, as a system of the type in which the HSM is carried out on the server side, there is such a system employing a stub file for implementation on the file system level, without specifying to applications.

The difference between the stub file and the short-cut file is that the short-cut file is recognized by the file system, while the stub file is a routine file on the file system and it is the HSM-accommodating software that recognizes the file system.

The HSM carried out on the server side suffers from an inconvenience that the servers must be able to cope with HMS, such that it is necessary to exchange pre-existing servers for new HSM-accommodating servers.

As for an intermediate device (switch) enabling plural file servers to be accessed from a client as a sole file system, reference is made e.g. to Patent Document 1. As for the hierarchical storage device, there is disclosed in Patent Document 2 such a configuration of the hierarchical storage device, supervising voluminous data with plural recording mediums with differing access speeds (primary and secondary storage mediums), and which enables less frequently used data to be automatically stored in the secondary storage mediums. In Patent Document 3, there is disclosed a configuration in which a CIFS (Common Internet File System) protocol filter processes write SMB (Server Message Block) message data, sent from a CIFS client, with striping, and in which, in reading data, the data are read in order alternately from plural servers for restoration.

[Patent Document 1]
JP Patent Kokai Publication No. JP-P2003-203029A
[Patent Document 2]
JP Patent Kokai Publication No. JP-P2001-222450A
[Patent Document 3]
JP Patent Kokai Publication No. JP-P2003-150435A

SUMMARY OF THE DISCLOSURE

The conventional hierarchical storage management system suffers from the following inconveniences.

The first inconvenience is that the conventional hierarchical storage management system is difficult to introduce for a user.

In the case of the HSM-accommodating software, introduced to the client side, all clients must take the labor of introducing the HSM-accommodating software. In the case of the server side HSM, the units of the same vendor, adapted for coping with the HSM, must be provided unanimously, while the pre-existing storage devices cannot be used.

The second inconvenience is that a file migrated to the secondary storage appears to the client differently from what it appeared prior to migration. That is, such file migration to the secondary storage cannot be completely hidden from the client, depending on the particular HSM system.

Accordingly, it is an object of the present invention to provide a system and a method for storage management that may readily be introduced, and a corresponding program.

It is another object of the present invention to provide a system and a method for storage management that may enable the fact of movement to the secondary storage to be completely hidden from the client, and a corresponding program.

It is a further object of the present invention to provide a system and a method for storage management that may enable the maximum file size to be enlarged, and a corresponding program.

It is a further object of the present invention to provide a system and a method for storage management that may enable stubbing among plural distributed nodes, and a corresponding program.

It is yet another object of the present invention to provide a system and a method for storage management that may allow for trigger control of stubbing/no-stubbing, and a corresponding program.

The above and other objects are attained by the present invention having schematically the following configuration.

A controller in accordance with one aspect of the present invention comprises means for receiving a request for an access to a file of a file server when the access request to the file is issued from a client and for determining whether or not the file is a stub file on which has been recorded the position information of a real file moved from the file server to another file server and which has been stored in the file server, and control means for exercising control so that, if the file is the stub file and the access request necessitates accessing to the real file, the control means accesses the real file of the other file server based on the information of the stub file to return a response to the client. The controller of the present invention may further comprise means for storing and managing the information including the relationship of correspondence between the stub file stored in the file server and the real file stored in the other file server. If the access request can be coped with by the information as held by the controller, a response to the access request may be returned from the controller to the client without accessing the real file.

A storage management system in another aspect of the present invention comprises at least one client, a first server having a primary storage, a second server having a secondary storage, and a controller. The primary storage includes a stub file having recorded the position information of the real file moved from the primary storage to the secondary storage. The controller may manage control so that, when a request for accessing a file in the primary storage of the first server is issued from the client, the controller receives the file access request to decide whether or not the file being accessed is a stub file, and so that, in case the file is a stub file and the access request needs accessing to the real file, the controller accesses the real file of the secondary storage, using the information of the stub file, and returns a response to the client. Thus, the stub file is made to appear to the client as if it is an entity. In the storage management system of the present invention, the controller may include storage means for storing and managing the information including the relationship of correspondence between the stub file stored in the primary storage and the real file stored in the secondary storage. In case the access request can be coped with by the information retained by the controller, the controller may return a response for the access request to the client.

A method in a further aspect of the present invention is a storage management method for a system comprising at least one client, a first server having a primary storage, a second server having a secondary storage, and a controller, wherein the primary storage includes a stub file having recorded the position information of the real file moved from the primary storage to the secondary storage. The method comprises a step of the controller receiving, when a request for accessing a file in the primary storage of the first server is issued from the client, the file access request to decide whether or not the file being accessed is a stub file, and a step of the controller accessing, in case the file is a stub file and the access request needs accessing to the real file, the real file of the secondary storage based on the information of the stub file to return a response to the client, whereby the stub file is made to appear as if it is a real file to the client. The method of the present invention may further comprise a step of the controller storing and managing the information including the relationship of correspondence between the stub file stored in the primary storage and the real file stored in the secondary storage, and a step of the controller returning a response for the access request to the client in case the access request can be coped with by the information retained by the controller.

A computer program in a further aspect of the present invention allows a computer, forming a controller receiving a request for an access to a file of a file server when the access request to the file is issued from a client, to perform the processing of deciding whether or not the file is a stub file on which is recorded the position information of the real file migrated from the file server to another file server and which is stored in the file server, and the processing of exercising control, if the file is the stub file and the access request necessitates accessing to the real file, for accessing the real file of the secondary storage based on the information of the stub file to return a response to the client. The program according to the present invention may allow the computer to execute the processing of storing and managing, in storage means, the information including the relationship of correspondence between the stub file stored in the file server and the real file stored in the other file server, and the processing of returning a response to the access request from the controller to the client, without accessing the real file, if the access request can be coped with by the information retained by the controller.

The controller, storage management system, storage management method and the computer program, according to the present invention, may be configured as follows:

It is verified, based on the attribute information of a file in question, whether or not the file in question is a stub file.

The stub file is of a fixed size.

In a formulation time attribute column of the stub file, there is entered a value indicating that the file is a stub file.

In a change time attribute column of the stub file, there is entered a value indicating that the file is a stub file.

The stub file includes a magic number for enabling the controller (control device) to determine that a file in subject is a stub file.

The stub file includes an attribute of the real file.

The stub file includes an identifier for accessing the real file.

The identifier is a pathname, an ID generated by storage means, or an URL (Uniform Resource Locator).

The stub file includes plural identifiers.

Based on the file access from the client to the file server, it is checked whether or not an access in question is one for a stub file.

Based on a file ID or a file handle, contained in an access from the client, it is checked whether or not an access in question is one for a stub file.

An access request from the client is transmitted to a file server and, based on the attribute, included in the response from the file server, it is checked whether or not a file in question is a stub file.

The access request from the client is transmitted to the file server. If, based on the attribute contained in a response from the file server, it is determined that the file in question is likely to be a stub file, the stub file is read from the one file server. It is verified, from the magic number of the stub file, whether or not the file in question is a stub file.

If, in case the access request from the client is directly transmitted to the file server, the file attribute is changed, the means for determining whether or not the file in question is the stub file accesses the file server, before transmitting the access to the file server, to decide whether or not the file in question is a stub file.

The client checks the file access to the file server to determine whether or not the access in question is that for the stub file, and accordingly changes the control operation.

The stub file contains the description on the processing of the controller (control device), and carries out the operation presented by the contents of the description of the stub file.

If the subject of the access request from the client is not the stub file, the access request is directly transmitted to the server, while the response from the file server is directly transmitted to the client.

If the file in question is the stub file, the access is changed over to that for the real access without the client becoming aware of such change.

If, at the time of opening, the file being opened is the stub file, its file ID is held on memory. In subsequent access requests, employing the file IDs, each file ID is compared to the file ID, held on memory, to verify that the access is that for the stub file.

If, at the time of lookup (LOOKUP), the file in question is the stub file, its file handle is held on memory and, in subsequent requests, employing the file handle, the file handle is compared to the stored file handle to decide whether or not the access in question is the access to the stub file.

If, when the client reads or writes a file, an access in question is an access for a stub file, it is changed for accessing the real file.

The real file is opened and the file ID of the real file is stored as a set with the file ID of the stub file.

The real file is looked up (LOOKUP) and the file handle of the real file is stored as a set with the file handle of the stub file.

When an access request, employing the file ID of the stub file, is entered from the client, the file ID is exchanged for the file ID of the real file stored, and the access request is transmitted to the file server which has stored the real file.

When an access request, employing the file handle of the stub file, is entered from the client, the file handle is exchanged for the file handle of the real file stored, and the access request is transmitted to the file server which has stored the real file.

When a request for changing the attribute is entered from the client, the request is changed so that its stub file attribute will not be rewritten, and the request so changed is sent to the file server, by way of performing control so that the stub file attribute will not be rewritten.

There is provided a storage unit for caching the contents of the stub file and, in case an access has been made by the client, processing is carried out using the contents of the cache, without reading out the stub file per se from the one file.

When the attribute has been changed by update to the stub file from the client, the contents of the stub file data cached are updated, without changing the file attribute of the stub file per se, and the contents so changed are written back into the stub file per se when a closure (CLOSE) request has been made from the client.

When a closure (CLOSE) request is issued from the client, such request is received and the closure processing is carried out for both the stub file and the real file.

When a closure (CLOSE) request is issued from the client, this request is received and the table of the file IDs stored is erased.

In the case of a protocol in which the client does not definitely issue the closure (CLOSE), the time duration for the client to cache a file handle is taken account of and, in case there lacks an access from the client for a time longer than the time duration, the file handle conversion table stored is erased.

A file access response from the file server to the client is received and part of the information in the response is changed so as not to permit the client to become aware of the file in question being a stub file, and the response is then returned to the client.

When the client opens a file, it is verified whether or not the file is a stub file, from a file attribute. If the file attribute is attribute of a stub file, a response in which the file attribute has been changed to the real file attribute is returned to the client.

If, in a response from the file server to a command from the client for acquisition of attribute of a file, the file is a stub file, the attribute is changed to that of a real file, and a response thus changed is returned to the client.

The real file is copied and converted into a stub file without affecting the client.

The controller file of the one file server is copied to another file server, access by the client is transiently reserved, the file of the one file server is rewritten to a stub file and thereafter the access by the client is re-initiated.

The stub file is re-converted into the real file without affecting the client.

After the real file is copied in the temporary area of the one file server, the access by the client is temporarily reserved and the real file is exchanged for the stub file by renaming (RENAME). Thereafter, client accessing is re-initiated.

According to the present invention, since a controller, also referred to as an intermediate device, is provided between the client and the server, and the intermediate device handles only the standard file access protocol between the client and the server, it is unnecessary for the client or the server to perform special accommodating processing.

Moreover, according to the present invention, the controller completely hides the file migration to the secondary storage, on the level of the file access protocol, and hence processing goes on without the client becoming aware of the fact of file migration to the secondary storage.

According to the present invention, the maximum file size may be enlarged by storage of pathnames of plural divided files in a stub file. The divided files are provided with overlapping regions each corresponding to the read/write size at the maximum so that a command access will not be astride plural divided files.

The writing in the overlapping region of the paired divided files is synchronized.

If the file size has reached or exceeded a preset threshold value not larger than the maximum file size, a pathname is registered to the stub file as a pathname of a new divided file.

In first stubbing the original, the original filename is renamed (RENAME) so that the first divided file is arranged in the same file system as that of the original file, and subsequently generated divided files are arranged distributed in different file systems.

The stub files and real files may be distributed in a distributed wide area network file system (plural bases) for referencing one another.

If the real file is in a file system of an own base and the stub file relating to the real file is in the other base, and the attribute of the real file has been changed by updating the real file, the stub file of the other base is updated.

If the real file is in a file system of another base, it is transferred to the real file of the other base, based on the real file information in the stub file of the own base.

The real file of the other base is cached by the intermediate device, and the so cached information is stored in the stub file of the own base. If there is an access, the cache information of the stub file of the own base is compared to the attribute of the real file. If the cache is valid, a response is made using the cache.

In more detail, a file system of a base includes a caching area in which to cache a real file of the other base, and the cache information is recorded in the stub file.

The intermediate device includes a storage unit in which to store the cache information of the stub file associated with the cached real file. The intermediate device of the aforementioned one base receives the access request from the client and checks whether or not the cache information of the stub file has been stored in the storage unit of the intermediate device. If the information is stored in this storage unit, the intermediate device processes the access request from the client, using the real file of the cache area.

The stubbing is carried out when the stored capacity has reached a threshold value, as a trigger for stubbing. In this case, the stubbing may be carried out beginning from the non-accessed file.

In a distributed wide area environment, made up by plural bases, real files are placed in a relatively frequently accessed base, and the files in the other bases are stubbed, based on the user access information.

If a quota limit is set, a threshold value smaller than that is set, and control may be managed so that, when the threshold value is reached, the files with older access dates are moved to the lower layer.

The meritorious effects of the present invention are summarized as follows.

According to the present invention, hierarchical storage management may be realized without changing the pre-existing client server system, thereby significantly reducing the number of the steps of management.

Moreover, since the migration to the secondary storage may completely be hidden from the client, the client may manage the system without becoming conscious of the hierarchical storage management.

According to the present invention, in which the stub file is provided with the path information of plural divided files, it is possible to enlarge the maximum file size.

In addition, according to the present invention, the stub and real files of plural bases may reference one another. By placing real files in the more frequently accessed bases, and by stubbing the less frequently accessed bases, it is possible to suppress and diminish the communication between bases (clusters) and to prevent the performance from being decreased in reciprocal accessing among the plural bases.

Furthermore, according to the present invention, stubbing may be carried out automatically before the quota value reaches a setting value, whereby it is possible to prevent e.g. access lock due to quota error from occurring.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 28 is a sequential diagram illustrating WRITE caching in the system of FIG. 26 (stub side).

PREFERRED EMBODIMENTS OF THE INVENTION

Figure 1:
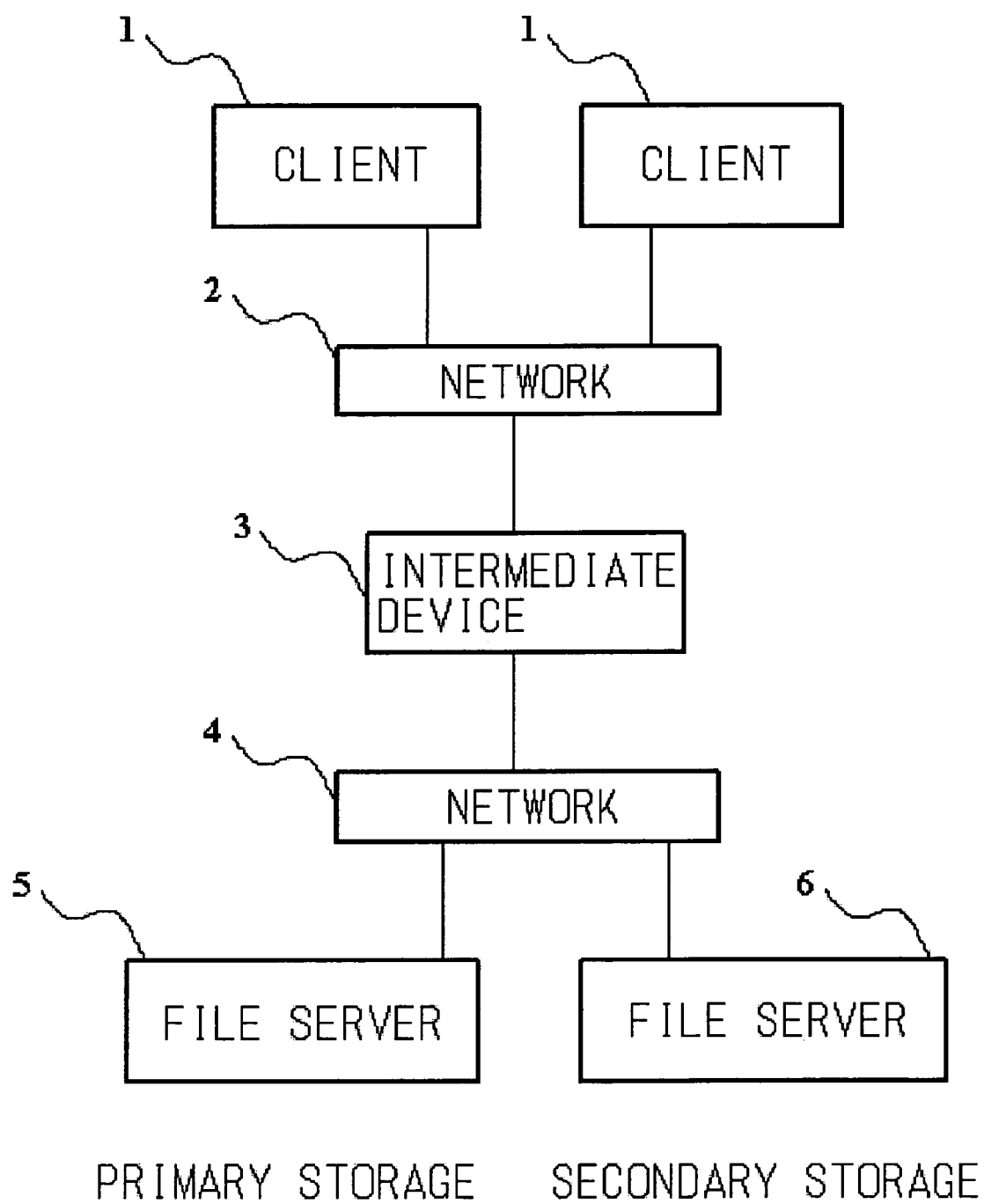
FIG. 1 is a diagram showing a system configuration according to an embodiment of the present invention.

Referring to the drawings, preferred embodiments of the present invention will be described in detail. FIG. 1 shows the system configuration of an embodiment employing an intermediate device according to the present invention. Referring to FIG. 1, showing the system according to an embodiment of the present invention, the clients 1, and the intermediate device 3, forming a control apparatus of the present invention, are interconnected over a network 2. The intermediate device 3 is connected over a network 4 to file servers 5 and 6. The file server 5 is a primary storage having a higher speed and a lower capacity, whilst the file server 6 is a secondary storage having a lower speed and a high capacity. As the networks 2, 4, an IP network, for example, is used. The client 1 accesses the file server 5 (primary storage) by, for example, a standard file access protocol, such as NFS (Network File System) or CIFS (Common Internet File System).

The client 1 assumes that the file of interest is in the file server 5 (primary storage) and accesses the file server 5 (primary storage).

When the file has been moved from the file server 5 to the file server 6 (secondary storage), the intermediate device 3 performs the processing of changing the access destination from the file server 5 (primary storage) to the file server 6 (secondary storage).

Since it is the intermediate device 3 that accesses the file server 6 (secondary storage), the client 1 is not aware that it is accessing the file server 6 (secondary storage), so that this fact is completely hidden for the client. Although the control apparatus of the present invention is constituted as the intermediate device 3 located between the client and the file access protocol of the file server, this configuration is merely illustrative, such that the control apparatus may be provided in the file server 5 (primary storage). The control apparatus may, of course, be composed by a software module.

Figure 2:
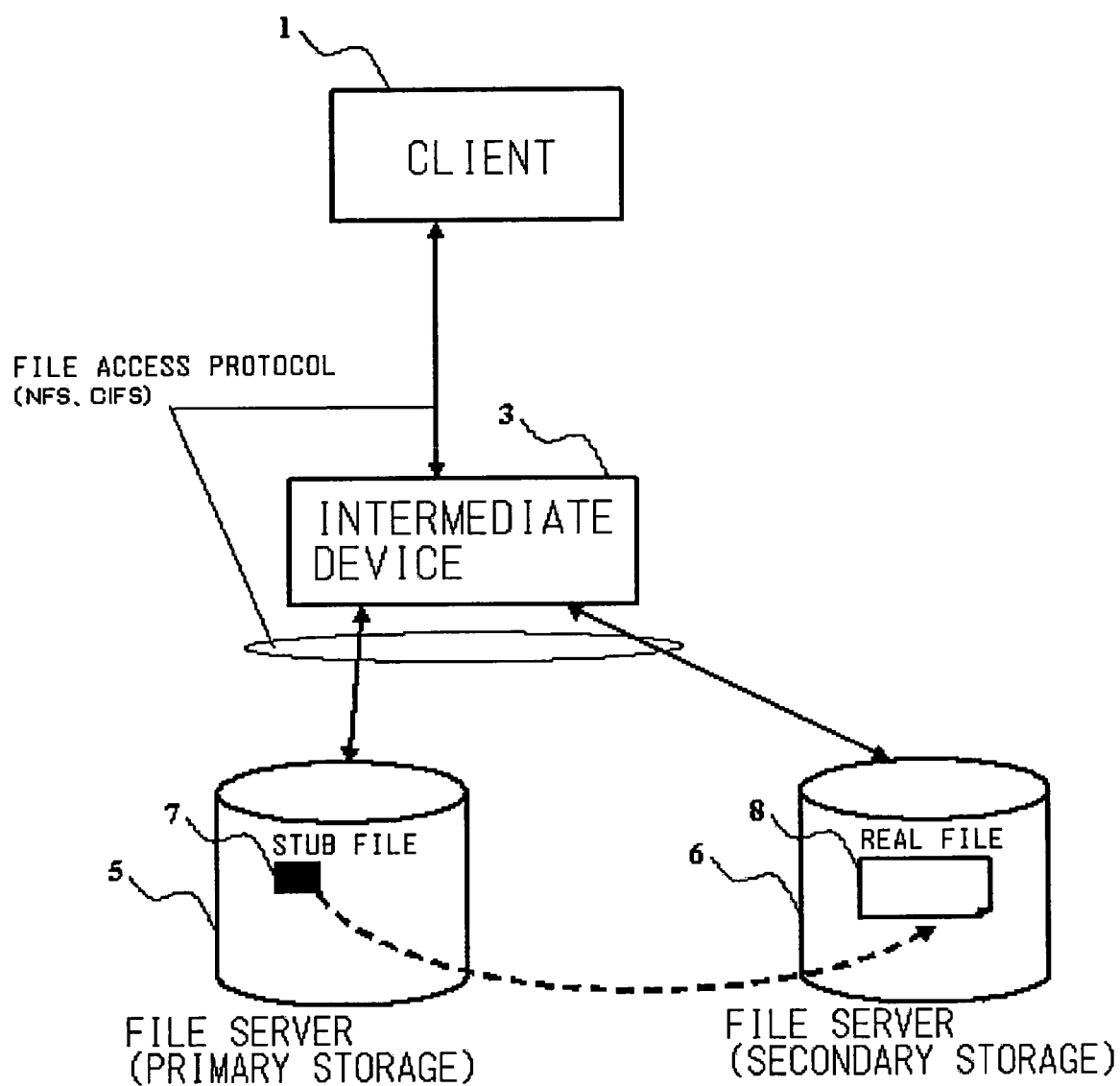
FIG. 2 is a diagram illustrating processing employing a stub file according to an embodiment of the present invention.

FIG. 2 illustrates the operating principle of an embodiment of the present invention. Referring to FIG. 2, a processing method used for changing the access from the file server 5 (primary storage) to the file server 6 (secondary storage) will now be described.

In the file server 6 (secondary storage), there is placed a real file 8 (a file moved from the file server 5 (primary storage)) and, in the file server 5 (primary storage), there is placed a stub file 7 corresponding to the real file 8. In the stub file 7 of the file server 5 (primary storage), there is stored a pathname of the real file 8 moved to the file server 6 (secondary storage).

If, when the client 1 has accessed a file in the file server 5 (primary storage), this file is the stub file 7, the intermediate device 3 accesses the real file 8 of the file server 6 (second storage), using a pathname stored in the stub file 7, to receive a response from the file server 6 (second storage) to return the response to the client 1. Hence, the client 1 is able to carry out file processing as if the real file 8 is on the file server 5 (primary storage).

The processing carried out by the intermediate device 3 will now be described concretely.

First, the intermediate device 3 has to determine whether or not the file accessed by the client 1 is the stub file 7. Hence, in the present embodiment, the stub file 7 is to be the following file:

An ID for specifying a stub file is set in a time stamp of the file in question (the time of preparation: Create Time is used in the CIFS and Mtime is used in the NFS).

The file size of the stub file is fixed at e.g. 1 kB. Preferably, the file size used is not liable to overlap with the size of an ordinary file, in order that the file in question may be discerned from a stub file or its candidate, based on the value of the file size.

A magic number is arranged at the start of the file data.

Since the file in question may be determined to be a stub file from an attribute of the file, that is, file time stamp and the file size, it is possible to make fast decision.

Moreover, in the present embodiment, in which the magic number is entered at the leading end of the file, it is possible to prevent mistaken recognition of the stub file to ensure more reliable discrimination of the stub file.

Figure 3:
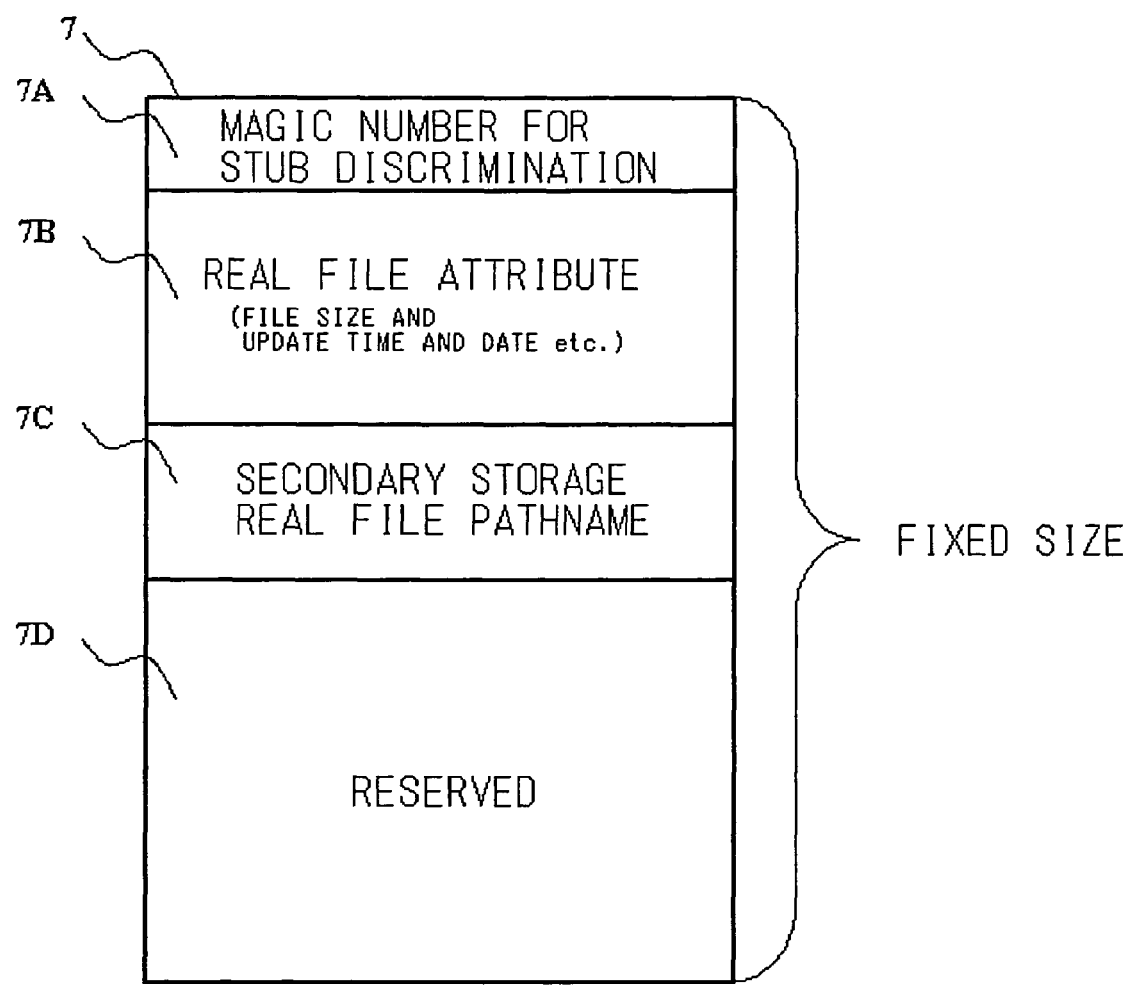
FIG. 3 shows a stub file format according to an embodiment of the present invention.

FIG. 3 depicts the format of the stub file 7 in an embodiment of the present invention. Referring to FIG. 3, the leading end of the stub file 7 is a magic number for stub discrimination 7A. This magic number is for ultimate recognition of the file in question being the stub file, and is to be of a preset length.

In the real file attribute 7B, the attribute of the real file 8 (e.g. the file size and the update time and date) are entered. By so doing, if an outstanding request is a request for retuning only the attribute, a response may be made without accessing the file server 6 (secondary storage).

A secondary storage real file pathname 7C is a pathname of the real file 8 in the file server 6 (secondary storage). Although there is no particular limitation, the file server 6 is a pathname, in the present embodiment, and is a server accessing a file. Hence, the file server 6 becomes the real file pathname 7C in the secondary storage. However, if the file server 6 is not a pathname and is a server specifying a file with some or other form of an ID, such ID is used. For example, a block address or the URL (Uniform Resource Locator) may be used, viz., it is sufficient that the secondary storage real file pathname 7C is such a one based on which the intermediate device 3 may have access to the real file 8.

A reserve 7D is a void region appended on order for the stub file 7 to be of a fixed length.

It should be noted that the format of the stub file 7 does not have to be in the order described above, and that one or more elements other than those shown in FIG. 3 may be added if so desired.

The merit of using the stub file 7 is that the intermediate device 3 does not have to own a table for files moved to the file server 6 (secondary storage).

Although the intermediate device 3 may own the totality of the information, without employing the stub file 7, it is then necessary to compare the totality of the requests from the client 1 with the table entries within the intermediate device 3.

With the system employing the stub file 7, a file in question may be determined to be a stub file by the intermediate device 3 sending a command from the client 1 to the file server 5 (primary storage) and checking the file distributes contained in the response from the file server 5. Thus, it is unnecessary for the intermediate device 3 to own the information of the totality of the stub files, and hence the number of the stub files

7 is not limited by the storage capacity of the intermediate device 3. There is no risk of the risk of the transfer speed being decreased due to scantiness of recording capacity of the intermediate device 3, thus assuring high-speed transfer.

Figure 4:
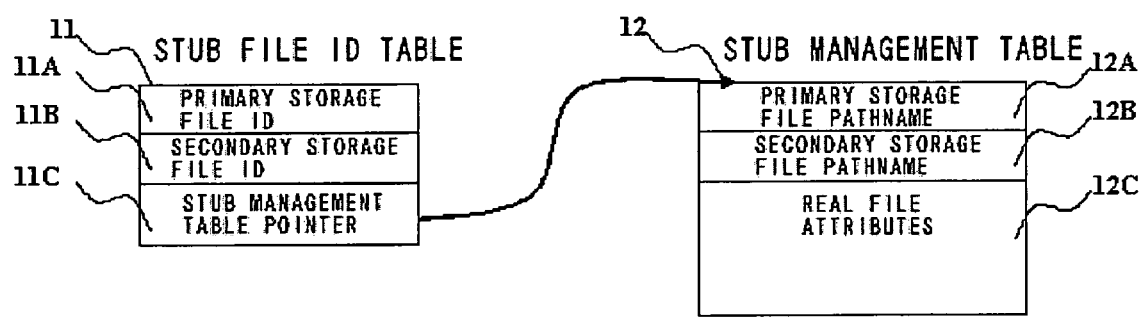
FIG. 4 shows a table provided to an intermediate device according to an embodiment of the present invention.

The table provided within the intermediate device 3 will now be described. The CIFS protocol has two tables shown in FIG. 4. A stub file ID table 11 is a table prepared when the client 1 has opened the stub file 7. At this time, it appears to the client 1 as if it is the real file 8 that has been opened. The stub file ID table 11 includes a primary storage FID (11A), a secondary storage FID (11B) and a stub management table pointer (11C).

The primary storage FID (11A) is a file ID of the stub file 7 of the file server 5 (primary storage). The file ID will be described subsequently.

The secondary storage FID (11B) is a file ID of the real file 8 of the file server 6 (secondary storage).

The stub management table pointer (11C) is a pointer to an associated stub management table 12.

The stub management table 12 is a table for caching the contents of the stub file 7 in the intermediate device 3 when the client 1 has accessed the stub file 7, and includes a primary storage file pathname (12A), a secondary storage file pathname (12B) and a real file attribute (12C).

The primary storage file pathname (12A) is a pathname of the stub file 7 of the file server 5 (primary storage).

The secondary storage file pathname (12B) is a pathname of the real file 8 of the file server 6 (secondary storage). The same contents as those of the secondary storage real file pathname 7C in the stub file 7 are set in this secondary storage file pathname.

The real file attribute (12C) is the attribute of the real file 8. The same content as that of the real file attribute 7B in the stub file 7 is set in the real file attribute.

However, when update is entered from the client 1 such that the attribute of the real file 8 has been changed, as when the file size has been increased by WRITE, there are occasion where such state can be coped with by simply rewriting the stub management table 12 in the intermediate device 3 without rewriting the real file attribute 7B in the stub file 7 each time. In such case, the real file attribute 7B in the stub file 7 differ from the real file attribute 12C of the stub management table 12.

The operation of the intermediate device 3 in case the client accesses through the intermediate device 3 will now be described.

In the following, the case of using the CIFS protocol, used as a file access protocol as default in the Windows (registered trademark) environment, is described. It is noted that, with other file access protocols, the present invention may be applied, with the basic operations being the same.

<OPEN (a Subject is Specified by a Pathname)>

Figure 5:
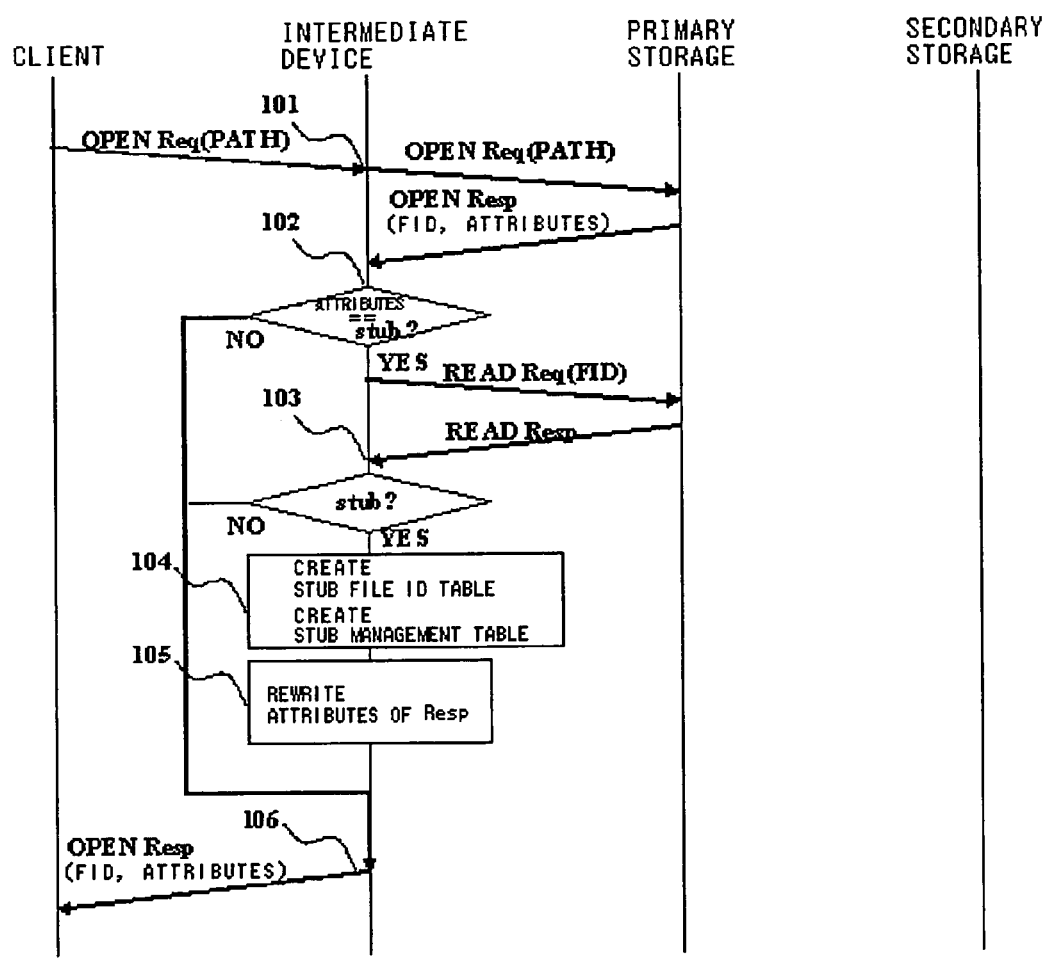
FIG. 5 is a sequence diagram illustrating the operation according to an embodiment of the present invention.

FIG. 5 is a sequence chart showing the processing when an OPEN request is issued from the client 1 and received by the intermediate device 3.

When the client 1 commences access, it first specifies a pathname to issue an OPEN request (OPENReq (PATH)). The file servers 5 and 6 return failure or success for the OPEN request and, in case of success, the file servers 5 and 6 return a file ID (FID) and a file attribute as a response.

During the time as from the outstanding OPEN request until CLOSE, the client 1 accesses by READ or WRITE, using a file ID, delivered thereto in the response from the file server to the OPEN request. This scheme is common to almost all file access protocols.

The intermediate device 3 receives the OPEN request (OPENReq (PATH)) from the client 1 to transfer it directly to the file server 5 (primary storage) (step 101).

The intermediate device 3 receives a response (OPENResp (FID, attribute)) from the file server 5 to check file attribute contained in the response (step 102).

If the file attribute is not the stub file attribute (decision NO of step 102), the intermediate device 3 directly sends the response from the file server 5 (OPENResp (FID, attribute)) to the client 1 (step 106). The stub file attribute is the file attribute in which the time stamp and the file size of the file attribute indicate that the file is the stub file, as described above.

In case the file attribute is a stub file attribute (decision YES of step 102), the intermediate device 3 reads the leading end of the file for confirmation (READReq (FID)) to check the magic number at the leading end of the file (step 103). If the file in question is not the stub file 7 (decision NO in step 103), the intermediate device 3 directly transfers the response from the file server 5 (OPENResp (FID, attribute)) to the client 1 (step 106).

If the file in question is the stub file 7 (decision YES in step 103), the intermediate device 3 formulates the stub file ID table 11 and the stub management table 12 (step 104). If the stub management table 12 of the stub file 7 already is present in the intermediate device 3, as when another client 1 has already opened this stub file (OPEN) or when there has come a command specifying the pathname without opening (OPEN), such as a FIND-related command, no new table is formulated.

The intermediate device 3 then rewrites the file attribute in the response (OPENResp (FID, attribute)) from the file server 5 (primary storage) to the real file attribute (12C) in the stub management table 12 (step 105) to transfer the (OPENResp (FID, attribute)) to the client (step 106).

Since the attribute of the real file 8 is delivered in this manner to the client 1, the fact that the file in question is the stub file 7 is hidden from the client 1. Meanwhile, the above-described processing by the intermediate device 3 may be implemented by the program executed on a computer of the intermediate device 3.

<READ/WRITE (a Subject is Specified by a File ID>

Figure 6:
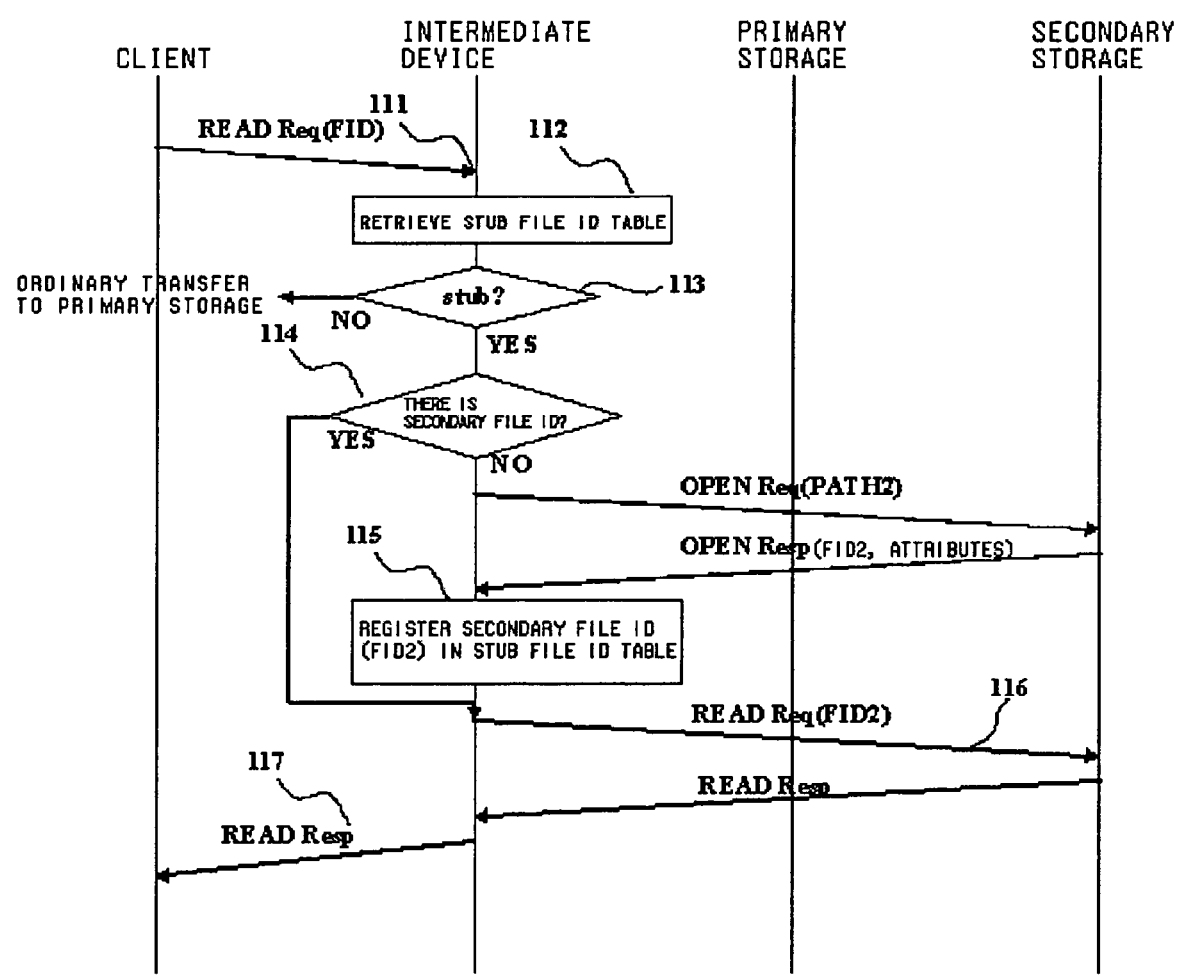
FIG. 6 is a sequence diagram illustrating the operation according to another embodiment of the present invention.

FIG. 6 is a flowchart showing the processing sequence when the READ/WRITE request from the client 1 has been issued. It is noted that FIG. 6 shows the processing sequence when a READ request is issued.

The client 1 in the READ request (READ Req(FID)) specifies a file ID (FID) (step 111).

The intermediate device 3 receives the READ request (READ Req(FID)) from the client 1 to retrieve the file ID from the stub file ID table 11 (step 112). If, as a result of retrieval in the step 112, the file ID in question is not present in the stub file ID table 11 (NO branching in a step 113), it is seen that the file in question is not the stub file. Thus, the intermediate device 3 directly transfers the READ request (READ Req(FID)) as usual to the file server 5 (primary storage). The intermediate device 3 also returns the response from the file server 5 (primary storage) directly to the client 1.

If, in the intermediate device 3, the file ID is present in the stub file ID table 11 (YES branching of step 113), the intermediate device 3 checks whether or not the secondary storage FID (11B) of the stub file ID table 11 is valid (step 114). For checking whether or not the secondary storage FID (11B) is valid, the secondary storage FID (11B) is set to NULL, at the time of formulation of the stub file ID table. If the secondary storage FID is different from NULL on check, the secondary storage FID may be verified to be valid.

If, as a result of decision in the step 114, the secondary storage FID (11B) is valid (YES branching in the step 114), the intermediate device 3 transfers the READ request to the file server 6 (secondary storage), using the secondary storage FID (11B), and transfers the response from the file server 6 (secondary storage) to the client 1 (step 117).

If the result of decision of the step 114 indicates that the secondary storage FID (11B) is invalid (NO branching in the step 114), the intermediate device 3 has not OPENed the real file 8 of the file server 6 (secondary storage) because READ and WRITE are initial READ and WRITE after OPENing. Hence, the intermediate device 3 opens the real file 8 of the file server 6 (secondary storage), using the secondary storage file pathname (12B) in the stub management table 12, in order to register the file ID of the response of the file server 6 (secondary storage) in the secondary storage FID (11B) of the stub file ID table 11 (step 115). That is, the intermediate device 3 sends an OPEN request (OPEN Req (PATH2)) to the file server 6 (secondary storage) and stores the file ID of the secondary storage (FID2) from the response from the file server 6 (secondary storage) (OPEN Resp (FID2, attribute) in the secondary storage FID (11B) of the stub file ID table 11, as a result of which, the secondary storage FID (11B) becomes different from the initialized value NULL.

The intermediate device 3 then sends the READ request (READ Req(FID2)) to the file server 6 (secondary storage), using the secondary storage FID (11B) (step 116). The intermediate device 3 then receives a response (READ Req) from the file server 6 (secondary storage) to transfer the response to the client 1 (step 117).

When the access request from the client 1 is a WRITE request, there are occasions where the file size is changed as a result of writing. Since the real file attribute 7B are provided in the stub file 7 of the file server 5 (primary storage), a corresponding update has to be made. In the present embodiment, only the real file attribute 12C in the stub management table 12 cached in the intermediate device 3 are updated, in case the file size of the real file has been updated, and the real file attribute changed is written back to the stub file 7.

This dispenses with the operation of re-writing the file server 5 (primary storage) each time thus enabling high-speed transfer. Meanwhile, the above processing of the intermediate device 3 may be implemented by a program run on a computer forming the intermediate device 3.

<Command of Attribute GET-based System (a Subject is Specified by File ID)>

Figure 7:
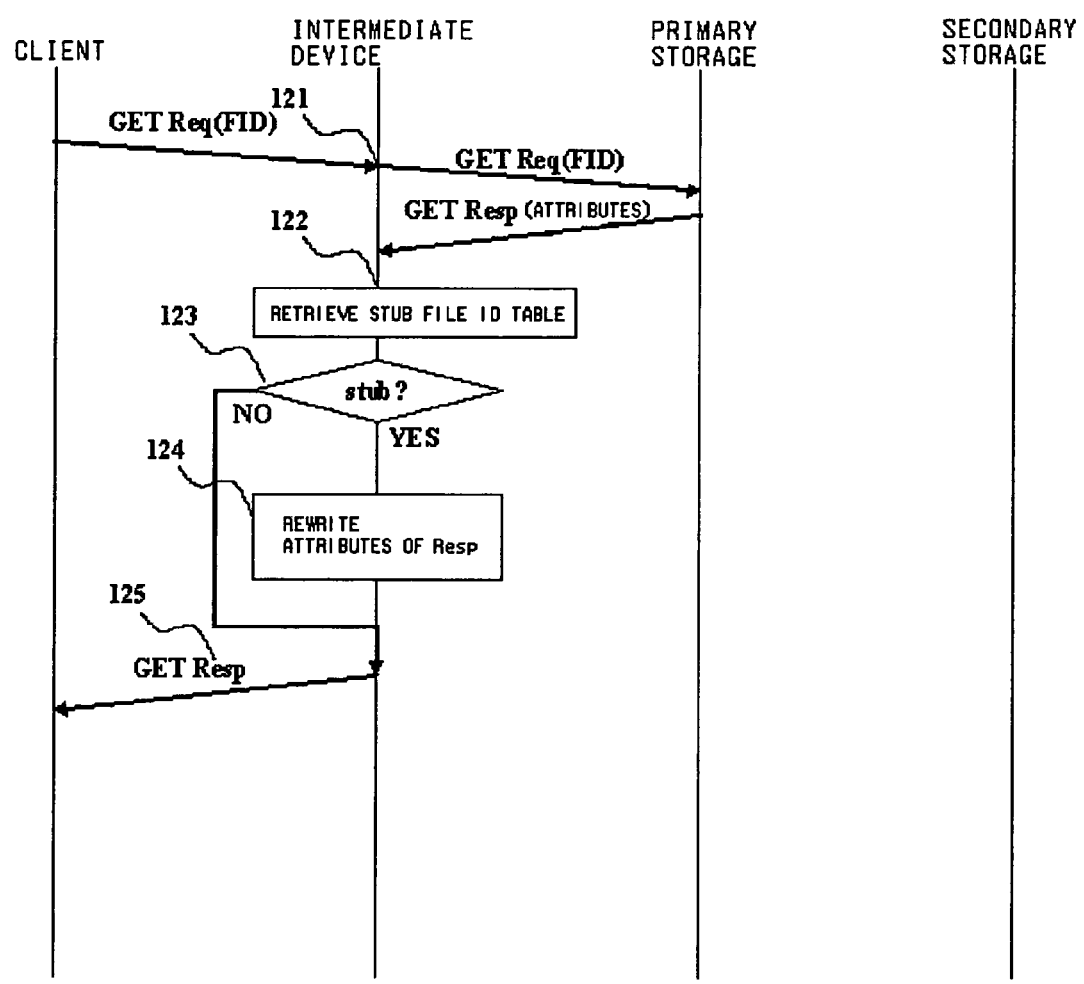
FIG. 7 is a sequence diagram illustrating the operation according to a further embodiment of the present invention.

FIG. 7 is a flowchart showing the processing sequence in case a command, specifying an object by a file ID, is issued in the attribute GET system. In the intermediate device 3, the attribute GET request, emanating from the client 1, is sent to the file server 5 (primary storage) (step 121).

The intermediate device 3 retrieves the stub file ID table 11 with the file ID (FID) of the attribute GET request (GETReq (FID)) (step 122) to decide whether or not the file in question is the stub file (step 123).

If, as a result of decision in the step 123, the file in question is not the stub file (NO branching in the step 123), the intermediate device 3 directly sends the response (GETResp) from the file server 5 (primary storage) to the client 1 (step S125).

If, as a result of decision in the step 123, the file in question is the stub file (YES branching in the step 123), the intermediate device 3 rewrites the file attribute, contained in the response (GETResp (attribute)), to the real file attribute 12C in the stub management table 12 (step 124) and transfers the response (GETResp (attribute)) to the client (step 125).

In FIG. 7, if retrieval is made from the file ID contained in the attribute (GETReq (FID)), it may appear to be unnecessary for the intermediate device 3 to transfer the attribute (GETReq (FID)) to the file server 5 (primary storage). However, in order to effect the processing, such as access right check of the client 1, in the file server 5 (primary storage), the intermediate device 3 must necessarily transfer the attribute GET request (GETReq (FID)) to the file server 5 (primary storage) and, if the response from the file server 5 (primary storage) is in error, the intermediate device 3 must necessarily return the response as it is in error state to the client.

<Attribute GET-based Command (a Subject is Specified by a Path)>

Figure 8:
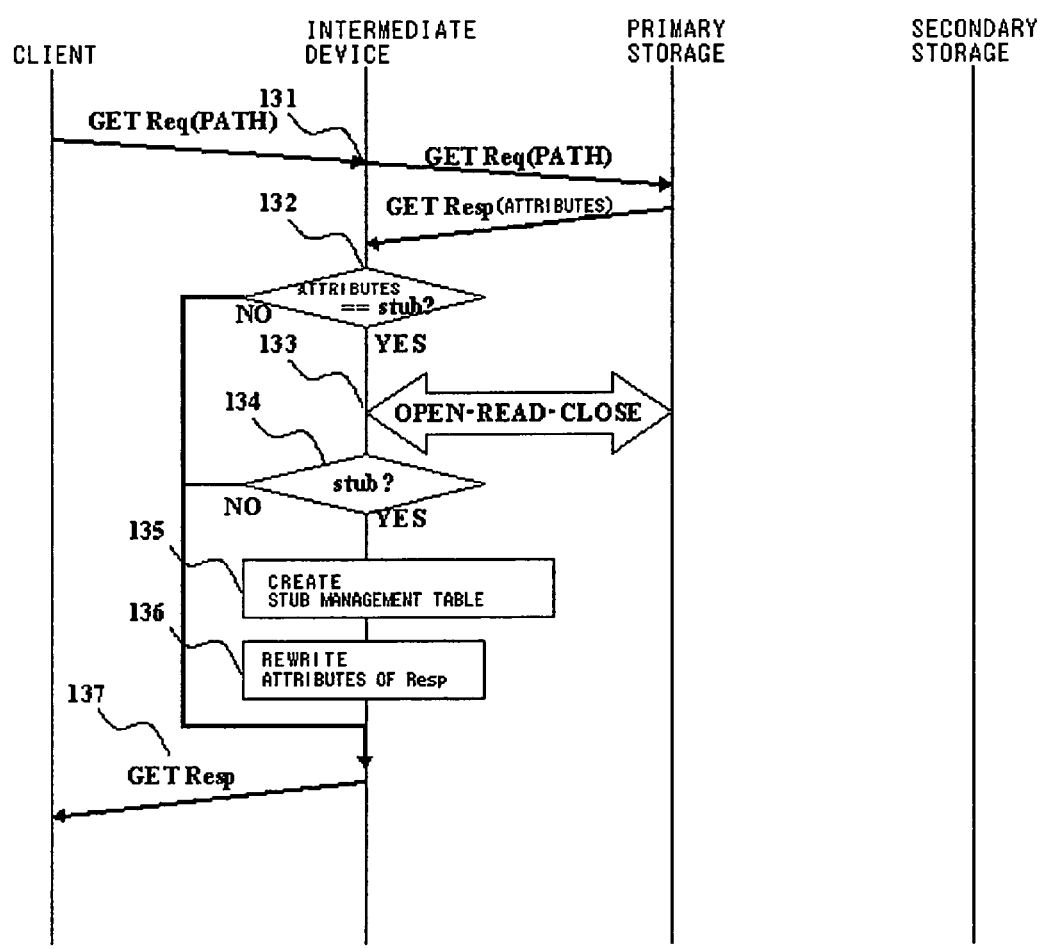
FIG. 8 is a sequence diagram illustrating the operation according to a further embodiment of the present invention.

FIG. 8 is a flowchart showing the processing sequence in case the command specifying an object by the path name has been issued in the attribute GET system.

The intermediate device 3 transmits the attribute GET request (GETReq (PATH)), sent from the client 1, to the file server 5 (primary storage) (step 131).

Since the file attribute is contained in the response (GETResp (attribute)) from the file server 5 (primary storage), the intermediate device 3 verifies if the file attribute in question is stub file attribute (step 132). If the file in question is not the stub file (NO branching in the step 132), the intermediate device 3 sends the response (GETResp) directly to the client 1 (step 137).

If the attribute is the stub file attribute (YES branching in the step 132), the intermediate device 3 opens the stub file 7 of the file server 5 (primary storage) to read (READ) the contents thereof to close the stub file 7.

The intermediate device 3 verifies the leading end magic number as read (see FIG. 3) to decide whether or not the file in question is the stub file (step 134). If the file in question is not the stub file (NO branching of the step 134), the intermediate device 3 returns the response (GETResp) directly to the client.

If the file in question is the stub file (YES branching of the step 134), the intermediate device 3 makes out the stub management table 12 (step 135) and exchanges the file attribute of the response (GETResp (attribute)) for the real file attribute 7B of the stub file 7 (step 136) to transmit the real file attribute to the client 1 (step 137).

Since the processing of formulating the stub management table in the step 135 is carried out so that the table will subsequently serve as cache for such a case the same file is accessed later, the processing may also be dispensed with.

<Attribute SET-based Command (a Subject is Specified by the File ID)>

Figure 9:
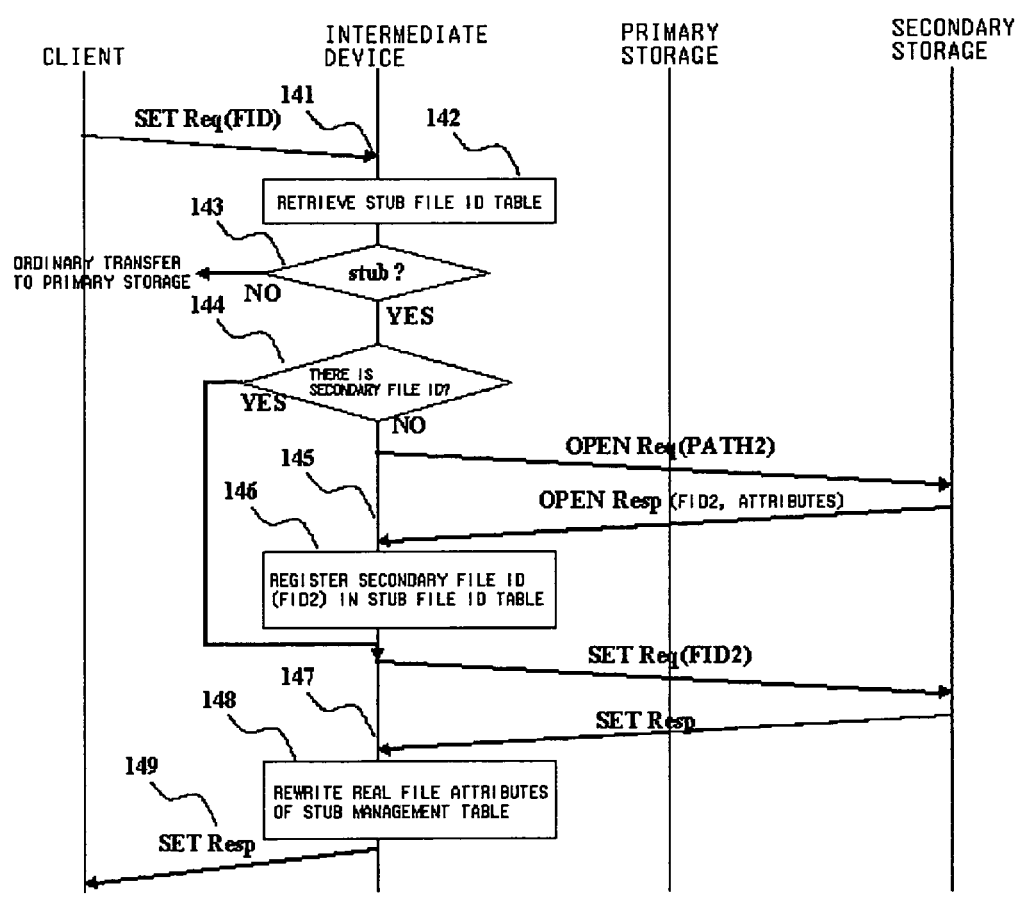
FIG. 9 is a sequence diagram illustrating the operation according to a further embodiment of the present invention.

FIG. 9 is a flowchart showing the processing sequence in case a command specifying a subject with the file ID in the attribute SET system has been issued. The attribute SET system differs from the GET system in that, if a file in question is directly sent to the file server 5 (primary storage), and the file is actually a stub file, the stub file attribute is rewritten, as a result of which the intermediate device 3 is unable to recognize the stub file. Hence, in the present embodiment, stub file decision is first made, followed by transmission.

First, when the intermediate device 3 has received an attribute SET request (SETReq (FID)) from the client 1 (step 141), the intermediate device retrieves the stub file ID table 11 with the file ID, as in the case of the READ/WRITE request (step 142). If the file is not the stub file (NO branching of step 143), the intermediate device 3 directly transmits the attribute SET request to the file server 5 (primary storage).

If the file is the stub file (YES branching of step 143), the intermediate device 3 checks in a step 144 whether or not the secondary storage FID (11B) of the stub file ID table 1 is valid, that is, whether or not there is the secondary file ID (step 144). If the secondary storage FID is valid (YES branching of step 144), the intermediate device 3 transfers the attribute SET request (SETReq (FID2)), whose attribute has been changed to the secondary storage FID (11B), to the file server 6 (secondary storage), to receive the response (SETResp) from the file server 6 (secondary storage) (step 147).

If the response (SETResp) indicates success of the attribute SET, the real file attribute (12C) in the stub management table 12 are rewritten (step 148) and a response (SETResp) is transferred to the client (step 149).

If the secondary storage FID (11B) is invalid (NO branching in the step 144), the intermediate device 3 sends an OPEN request (OPENReq (PATH2)) to the file server 6 (secondary storage) to open a file path name of the secondary storage (12B) (OPEN) (step 145) to register the file ID (FID2) of the response (OPENResp (FID2, attribute)) from the file server 6 (secondary storage) in the secondary storage FID (11B) of the stub file ID table (step 146). Subsequently, the attribute SET request (SETReq (FID2)) is transferred to the file server 6 (secondary storage) (step 147), as in the case where the secondary storage FID (11B) is valid, and the real file attribute (12C) in the stub management table 12 are rewritten (step 148) for transfer to the client (step 149).

<Attribute SET based Command (a Subject is Specified by a Pathname)>

Figure 10:
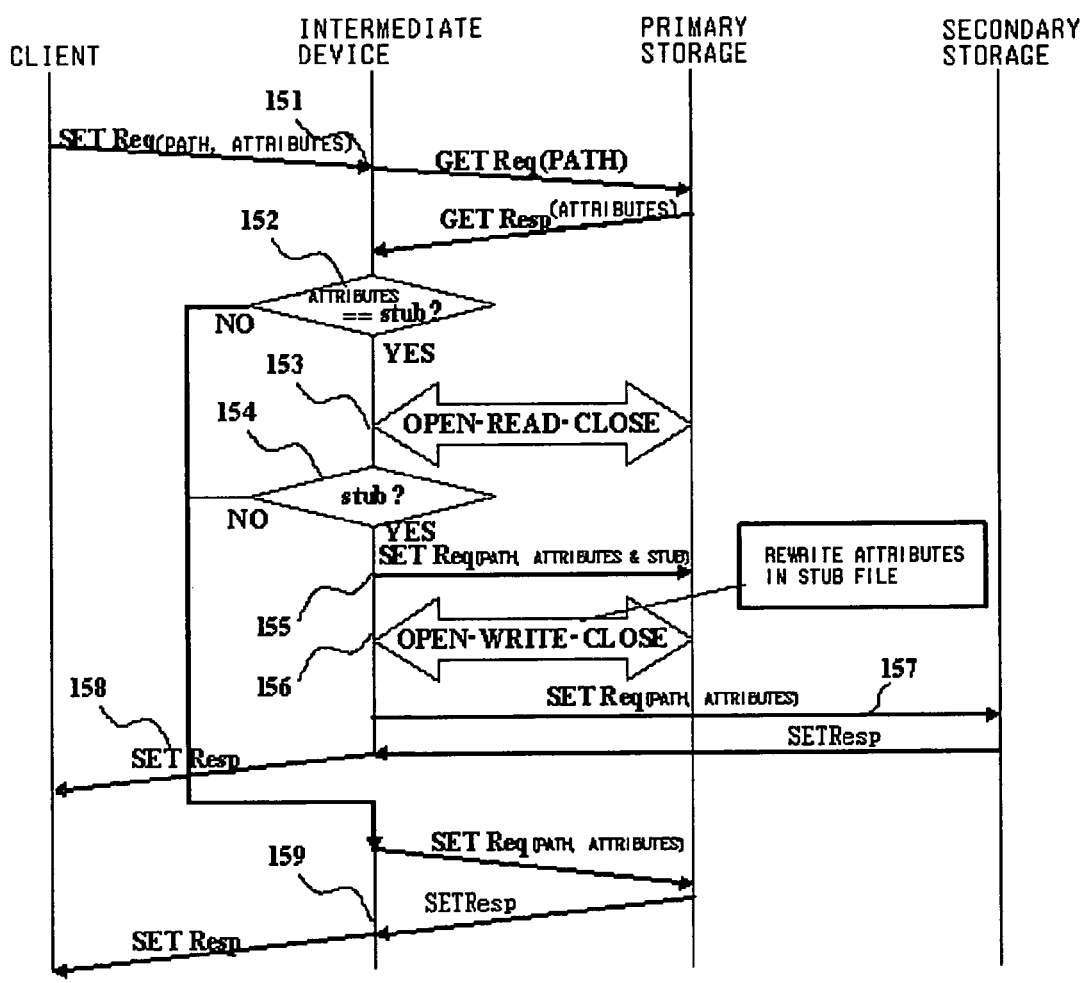
FIG. 10 is a sequence diagram illustrating the operation according to a further embodiment of the present invention.

FIG. 10 is a flowchart showing the processing sequence in case the command of the attribute SET type specifying the subject by the pathname is issued. In this case, stub file decision needs to be executed prior to transfer, as in the operational sequence described with reference to FIG. 9. FIG. 10 differs from FIG. 9 in that, since the stub file ID table 11 has not been prepared, the file server 5 (primary storage) is accessed really for decision.

On receipt from the client 1 of an attribute SET request (SETReq (PATH, attribute), the intermediate device 3 sends the attribute GET request (GETReq (attribute)) to the file server 5 (primary storage), using its pathname. The intermediate device 3 determines whether or not the attribute of the response (GETResp (attribute)) from the file server 5 (primary storage) is a stub file attribute (step 152). In case the attribute is not the stub file attribute (NO branching of the step 152), the attribute SET request (SETReq (PATH, attribute)) is transferred to the file server 5 (primary storage) and the response from the file server 5 (primary storage) is transferred to the client 1 (step 159).

If the attribute is the stub file attribute (YES branching of the step 152), the intermediate device 3 opens the file server 5 (primary storage) (OPEN) with its pathname, for acquiring the magic number for stub discrimination 7A, and reads (READ) the leading end of the file to CLOSE it (step 153).

If the leading end of the file is not the magic number for stub discrimination 7A (NO branching of step 154), the file is not the stub file. Hence, the intermediate device 3 transfers the attribute SET request (SETReq (PATH, attribute)) to the file server 5 (primary storage) and transfers the response (SETResp) from the file server 5 (primary storage) to the client 1 (step 159).

In case the file has been confirmed to be the stub file (YES branching of the step 154), the intermediate device 3 first transfers the attribute SET request (SETReq (PATH, attribute & stub) to the file server 5 (primary storage) (step 155). At this time, the stub file attribute Stub is embedded in the attribute to be set (SET) for transmission. By so doing, the stub file attribute is not lost.

Then, for rewriting the real file attribute in the stub file 7, the intermediate device 3 OPENs the stub file 7 and WRITEs the real file attribute in the stub file 7 to CLOSE it (step 156).

In the case of the attribute SET based command, specifying a subject with the file ID, opening (OPEN) has already been made by the client, and hence the stub management table 12 has already been prepared in the intermediate device 3, such that changes in attribute need to be reflected only in the stub management table 12 when the CLOSE has been sent from the client 1. However, with the attribute SET based command, specifying the subject with a pathname, no opening (OPEN) has been made and hence there is no stub management table. Thus, the changes in the attribute need to be reflected in the real file attribute 7B in the stub file 7.

The intermediate device 3 then transmits the attribute SET request (SETReq (PATH, attribute)) to the file server 6 (secondary storage) (step 157) and receives the response (SETResp) from the file server 6 (secondary storage) to send it to the client 1 (step 158).

<READDIR, FIND based Command (Specifying a Subject with a Pathname)>

Figure 11:
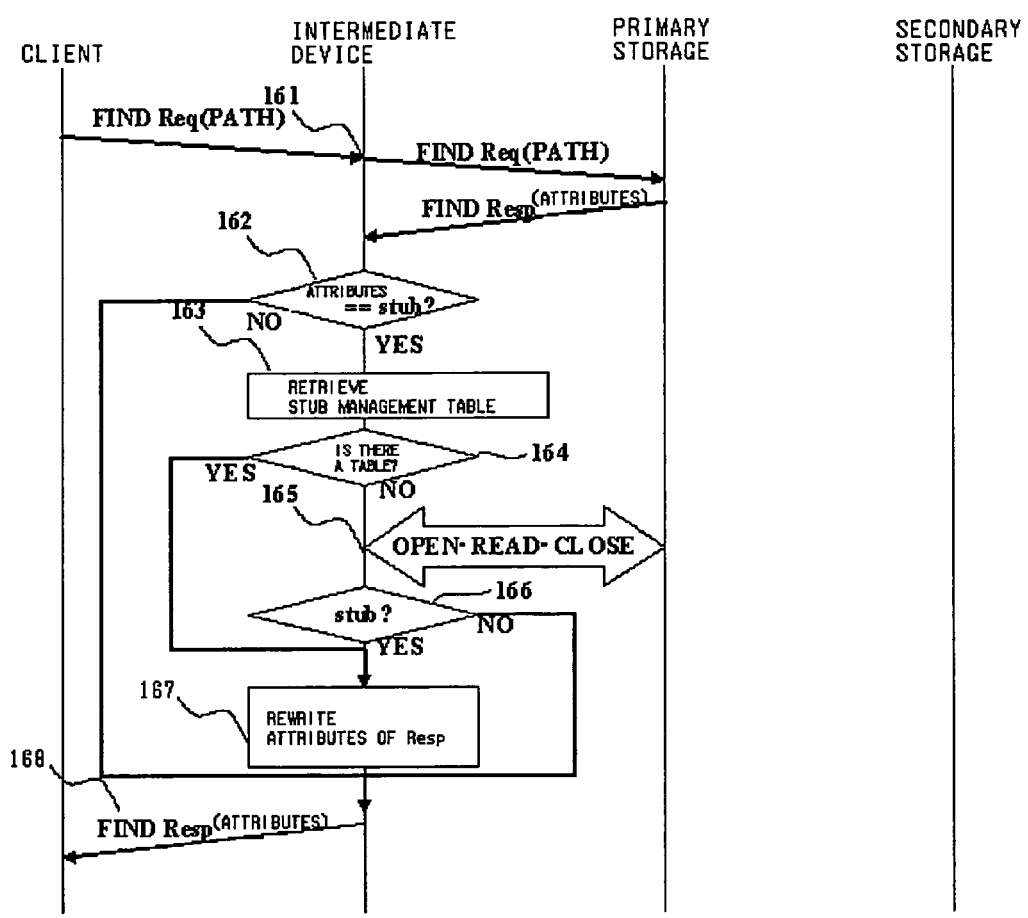
FIG. 11 is a sequence diagram illustrating the operation according to a further embodiment of the present invention.

FIG. 11 depicts a flowchart showing a processing sequence in case the command is the READDIR•FIND based command.

On receipt of the FIND based request (FINDReq (PATH)) from the client 1, the intermediate device 3 transmits it to the file server 5 (primary storage) (step 161). The intermediate device 3 gives a decision as to whether or not the attribute contained in the response from the file server 5 (primary storage) (FINDResp (attribute)) is the stub file attribute (step 162). If the attribute is not the stub file attribute (NO branching of the step 162), the intermediate device directly transfers the response (FINDResp (attribute)) to the client 1 (step 168).

If the attribute is the stub file attribute (YES branching of the step 162), the intermediate device 3 retrieves the stub management table 12 (step 163). If there is the stub management table (YES branching of the step 164), the attribute of the response (FINDResp (attribute)) is rewritten to the real file attribute (12C) (step 167) and the response with the so rewritten attribute is transferred to the client 1 (step 168).

If, on retrieval of the stub management table 12 in the step 163, the table has not been found (NO branching of the step 164), the intermediate device 3 performs the processing of OPEN, READ and CLOSE for the file server 5 (primary storage) in order to check for the magic number for stub discrimination 7A (step 165).

If the result (result of READ) indicates that a file in question is a stub file (YES branching of step 166), the intermediate device 3 rewrites the attribute (step 167). If the attribute is not that of the stub file 7 (NO branching of the step 166), the intermediate device 3 proceeds to response transfer processing for the client 1 (step 168). The stub management table 12 may at this time be in readiness for FIND based accesss possibly arriving from the client as from this time.

<CLOSE (a Subject is Specified with the File ID)>

Figure 12:
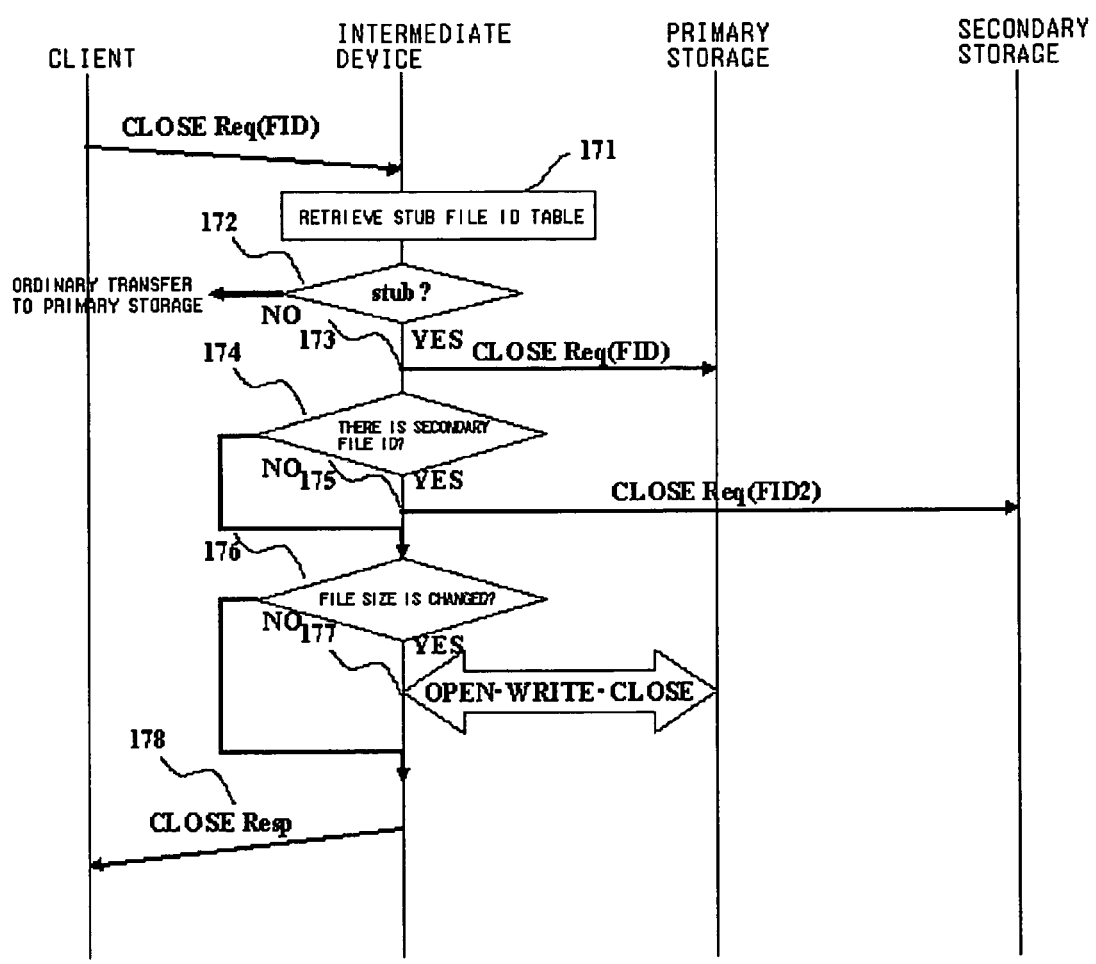
FIG. 12 is a sequence diagram illustrating the operation according to a further embodiment of the present invention.

FIG. 12 is a flowchart showing the processing sequence in case a CLOSE command has been issued.

On receipt of a CLOSE request from the client 1 (CLOSEReq (FID)), the intermediate device 3 takes out the file ID to retrieve the stub file ID table 11 (step 171).

If the file ID (FID) is not in the stub file ID table 11 (NO branching of the step 172), the file is not the stub file. Hence, the intermediate device 3 transfers the CLOSE request (CLOSEReq (FID)) to the file server 5 (primary storage) and transfers the response to the client 1.

If the file ID (FID) is in the stub file ID table 11 (YES branching of the step 172), the file in question is found to be the stub file. Hence, the intermediate device 3 transfers the CLOSE request (CLOSEReeq (FID)) to the file server 5 (primary storage), in order to close the stub file 7 (step 173).

If the secondary storage FID (11B) of the stub file ID table 11 is valid (YES branching of the step 174), the real file 8 is OPENed. Thus, the intermediate device 3 sends a close request (CLOSE) (CLOSEReq (FID2)) for the real file 8 of the file server 6 (secondary storage) (step 175).

Since there are occasions where the file size or the attribute has been changed due to WRITE during OPEN (YES branching in the step 176), the intermediate device 3 OPENs the stub file 7 in this case, and rewrites inner real file attribute 7B (OPEN-WRITE-CLOSE of the step 177).

Finally, the intermediate device 3 returns a response (CLOSEresp) to the client 1 (step 178). Meanwhile, the processing by the intermediate device 3, described with reference to FIGS. 7 to 13, may be implemented by a program executed on a computer forming the intermediate device 3.

Figure 13:
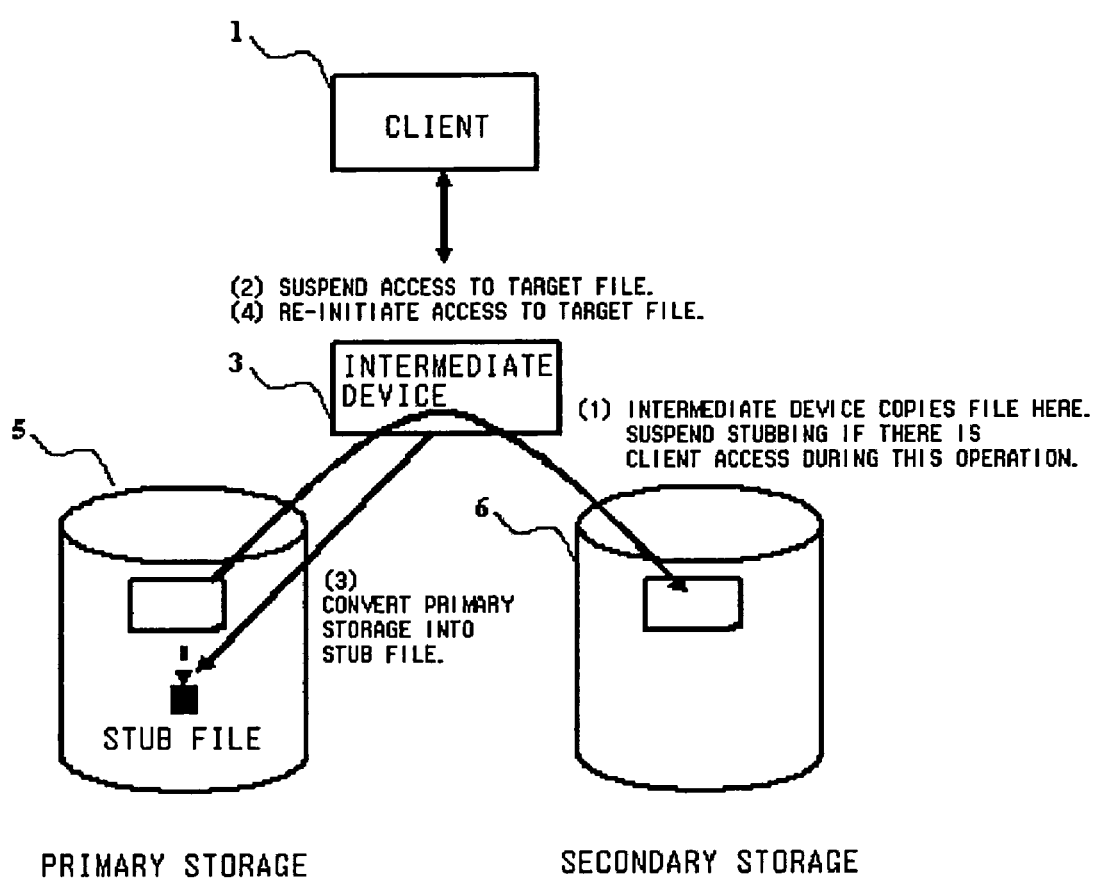
FIG. 13 is a diagram illustrating processing employing a stub file according to an embodiment of the present invention.

The operation of converting an ordinary file into a stub file will now be described. FIG. 13 illustrates the flow of moving a file from the file server 5 (primary storage) to the file server 6 (secondary storage) for conversion to a stub file.

First, the intermediate device 3 copies a file from the file server 5 (primary storage) to the file server 6 (secondary storage) (step 1). At this time, the intermediate device exercises control so that, if the client has accessed the target file in the interim, copying is discontinued, and the copying is re-started after lapse of a preset time.

When the copying has come to a close, the intermediate device 3 halts the accessing to the target file (subject file) from the client 1 (step 2). For suspending the accessing, the request is dropped, or the request is temporarily queued.

At any rate, accessing from the client 1 to target files of the file server 5 is prohibited. During this access stop time, the intermediate device 3 rewrites the target file of the file server 5 (primary storage) into a stub file (step 3).

The accessing, so far suspended, is subsequently re-started (step 4). The access halt time, corresponding to the time of rewriting to the stub file by the intermediate device 3, is usually extremely short because the stub file 7 is of a small size and, in a majority of cases, comes to a close with one WRITE and attribute SET.

Figure 14:
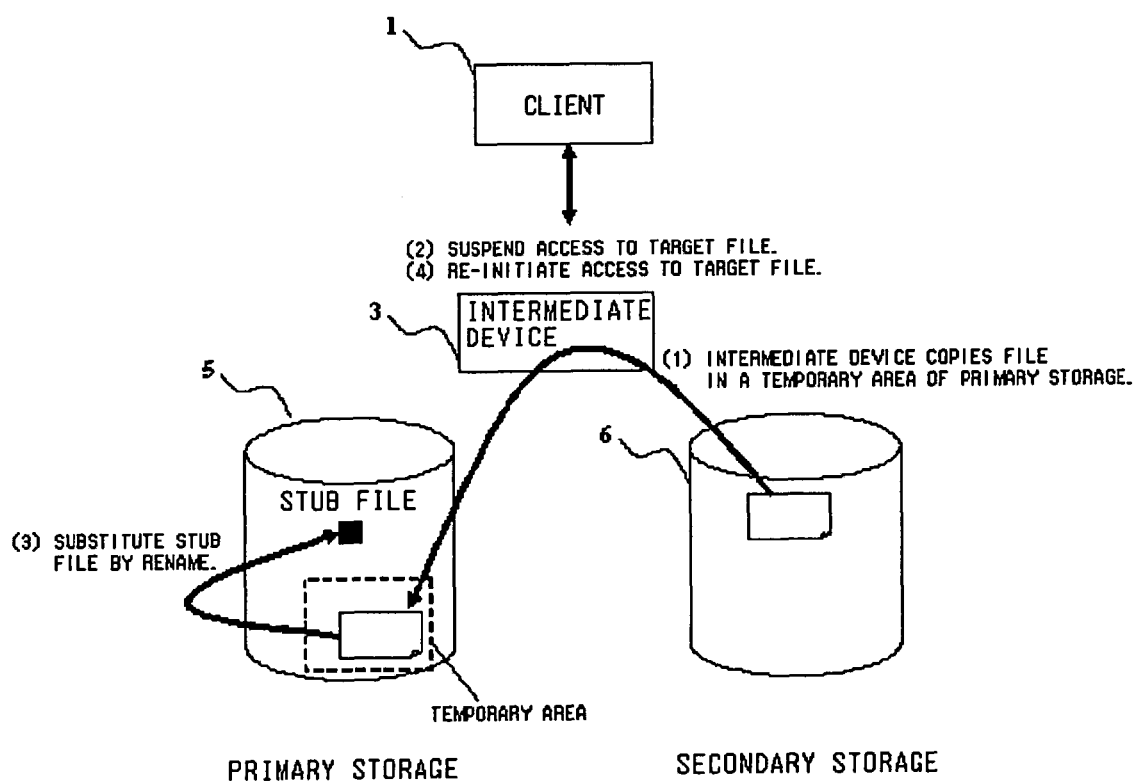
FIG. 14 is a diagram illustrating processing employing a stub file according to an embodiment of the present invention.

The operation of re-converting the stub file to the ordinary file will now be described. FIG. 14 illustrates the flow for returning a real file from the file server 6 (secondary storage) to the file server 5 (primary storage) to remove the stub file.

If the real file is copied in a rewrite manner from the file server 6 (secondary storage) to the stub file of the file server 5 (primary storage), the stub file ceases to be a stub file, such that, when access is made from the client 1 in the interim, the stub file cannot be verified to be a stub file. Consequently a half-finished file is undesirably presented to the client 1 during the copying.

For avoiding this problem, there is known a system in which access to the target file of the client 1 is suspended during copying. However, in this system, if the file size is large, the time duration of access suspension for the client 1 becomes appreciably longer to inconvenience the client 1.

For avoiding this problem and for achieving the re-writing which may not be inconveniencing to the client, a real file is copied from the file server 6 (secondary storage) to a temporary area of the file server 5 (primary storage) (step 1).

If, during the interim, the client has accessed a target file, the stub file 7 is left intact. This stub file is transferred by the intermediate device 3 by the system described above.

When the copying in the temporary area has come to a close, the access to the target file is suspended (step 2).

Subsequently, the intermediate device 3 substitutes a stub file for the real file in the temporary area with a RENAME command (step 3).

The intermediate device 3 then re-initiates accessing to the target file of the client 1 (step 4).

In this system, the time of access suspension for the client 1 is the time of the RENAME command. The RENAME command in the same file system usually consists only in changing an i-node table and may be finished in an extremely short time. Consequently, the re-writing may be made as it scarcely inconveniences the client 1. Meanwhile, the processing by the intermediate device 3 may be implemented by a program run on a computer of the intermediate device 3.

An embodiment in the case of the NFS protocol will be described. Differently from the CIFS protocol, the NFS protocol is such a protocol in which OPEN or CLOSE is issued on the network. With such protocol, the above flow of formulating a table with the aforementioned OPEN as a clue cannot be used. As in the case of CIFS, a stub file is used for implementation. The same holds for the contents of the stub file.

In the CIFS, the file ID is a temporary ID used only during the time as from OPEN until CLOSE of the client 1. In the NFS, an ID, termed a file handle, capable of distinguishing all files from one another, is used.

The client 1 enters the file handle of a parent directory and a filename desired to be searched, in a LOOKUP command, and sends it to a server. As a response, the client receives a file handle of a file.

Subsequently, the client executes READ and WRITE, using the file handle, without definitely doing the CLOSE.

Thus, the intermediate device 3 has the file handle, in place of the file ID, in the table, and checks whether or not the file handle contained in the READ-WRITE command of the client is a stub file.

If the file handles of the totality of stub files are provided in a table, the table size becomes excessive. For this reason, a table is prepared with LOOKUP as a clue and, lacking accessing for a certain time, non-accessed file handles are deleted from the table.

Figure 15:
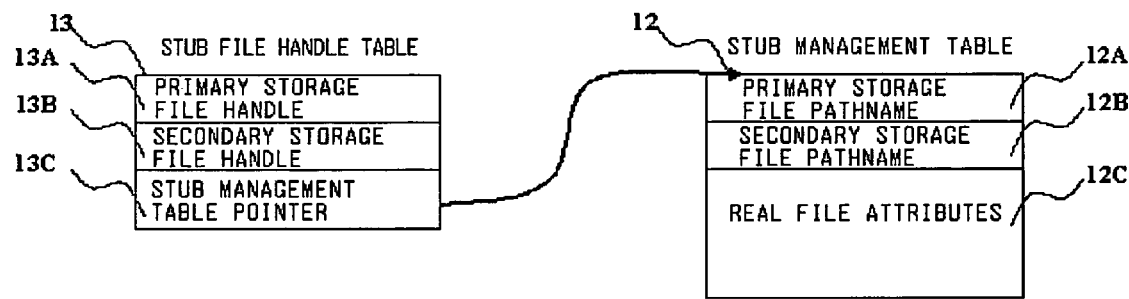
FIG. 15 shows a table owned by an intermediate device according to another embodiment of the present invention.

FIG. 15 shows an instance of the table owned by the intermediate device 3 in the case of the NFS. The stub management table 12 is similar to that for the CIFS, however, it has a stub file handle table 13 in place of the stub file ID table 11. Specifically, the table has a primary storage file handle 13A and a secondary storage file handle 13B, in place of the primary storage file ID 11A and the secondary storage file ID 11B.

Figure 16:
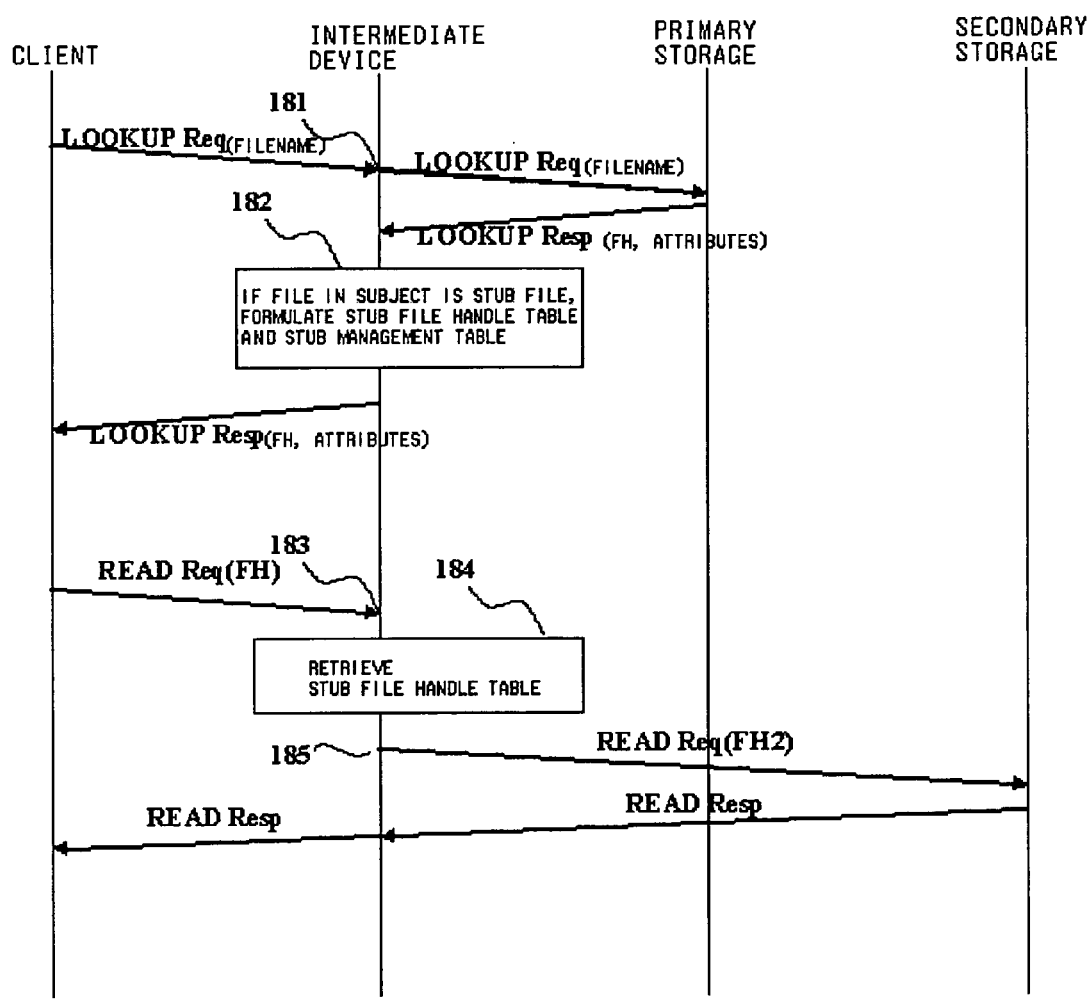
FIG. 16 is a sequence diagram illustrating the operation according to an embodiment of the present invention.

Referring to FIG. 16, the operation of the present embodiment will be described. When supplied with a LOOKUP request (LOOKUPReq (filename)) from the client 1, the intermediate device 3 transfers the request to the file server 5 (primary storage) (step 181) and monitors the file attribute contained in the response to check to see whether or not the file in question is the stub file 7.

If the file attribute is the stub file attribute (as determined by the time of change and the file size), the leading end of the file is actually read (READ) to confirm the magic number. If the file in question is the stub file, the stub file handle table 13 and the stub management table 12 are prepared in the intermediate device 3 (step 182).

The response from the file server 5 (primary storage) is transferred to the client 1 as the attribute of the response from the file server 5 (primary storage) is replaced by the real file attribute 12C. The retrieval can be accelerated if the stub file handle table 13 is able to hash and retrieve the file handle.

When subsequently supplied with the READ or the WRITE from the client 1 (step 183), the intermediate device 3 retrieves whether the file handle contained therein is in the stub file handle table 13 (step 184).

If the file is the stub file, the intermediate device transfers it to the file server 6 (secondary storage) (step 185). Meanwhile, the processing by the intermediate device 3 may be implemented by the program as run on a computer architecting the intermediate device 3.

When supplied with the first READ or WRITE, the intermediate device causes the file handle, obtained on LOOKUP, to be stored in the secondary storage file handle 13B of the stub file handle table 13, based on the secondary storage real file pathname 7C of the stub file 7.

In the subsequent READ and WRITE, the file handle is changed to the secondary storage file handle 13B in the stub file handle table 13 and transferred to the file server 6 (secondary storage).

If the command is such a one which acquires only the attribute without touching real data, such as GETATTR, it is transferred to the file server 5 (primary storage), without accessing the file server 6 (secondary storage), as the attribute of the response is changed based on the stub management table 12.

An identifier indicating that the file is a stub file may be entered in the file ID or in the file handle.

In the case of the CIFS protocol, it is decided on opening (OPEN) whether the file is a stub file or not. If the file is the stub file, a stub file identifier is entered in the file ID returned to the client. By so doing, it is only the file ID, in which the stub file identifier has been entered, that is to be retrieved in the stub management table during subsequent READ or WRITE, such that it is unnecessary to compare the file IDs in their entirety with the stub management table.

In the case of the NFS protocol, a stub identifier is entered in the file handle of the LOOKUP response. By so doing, it is necessary to retrieve the stub management table during READ or WRITE only with respect to the requests containing the stub identifier, while it is unnecessary to retrieve the stub management table for other requests. This reduces the processing load otherwise imposed on the intermediate device to enable high-speed transmission. In such case, a problem is raised when a file ID or a file handle not containing a stub identifier has already been delivered to the client at the time of preparation or deletion of a stub file. In order to cope with this, it becomes necessary to retrieve the stub management table for all requests before and after preparation or deletion of the stub file. For facilitating the processing, such processing may be made in which, when the clients are discriminated, and those clients, to whom the file ID or the file handle not containing the stub identifier has been delivered, may be discriminated, the stub management table is not retrieved for requests incoming from other clients.

There is such a configuration in which not only the pathname of the secondary storage but also the following information is entered in the stub file.

A plural number of secondary storage pathnames may be entered in the inside of the generation management stub file employing a plural number of secondary storage pathnames to supervise file versions. The real files of the secondary storage are copied at a certain time point and the latest real file in the stub file is accessed. By so doing, generation management may be facilitated even with file servers not having special functions, such as a snapshot function. This system differs from a system of simply copying and saving a file in that generation management may be hidden from the client and files of a previous generation cannot unduly be updated. Hence, there may be provided an assurance that the system is exempt from modification.

It is possible to state the processing additionally carried out by the intermediate device 3, so that the intermediate device 3 may carry out the processing different from one file to another. That is, the processing carried out by the intermediate device 3 is described in the stub file and, on incoming of an access from the client, the intermediate device 3 carries out the processing in accordance with the statement in the stub file. In the conventional configuration, the relationship between the files and the processing has to be tabulated and stored in other storage locations. According to the present invention, such table may be embedded in the file system and hence need not be separately provided, by employing a stub file. Hence, it is not necessary to retrieve a table from access to access, thereby accelerating and simplifying the processing.

Figure 17:
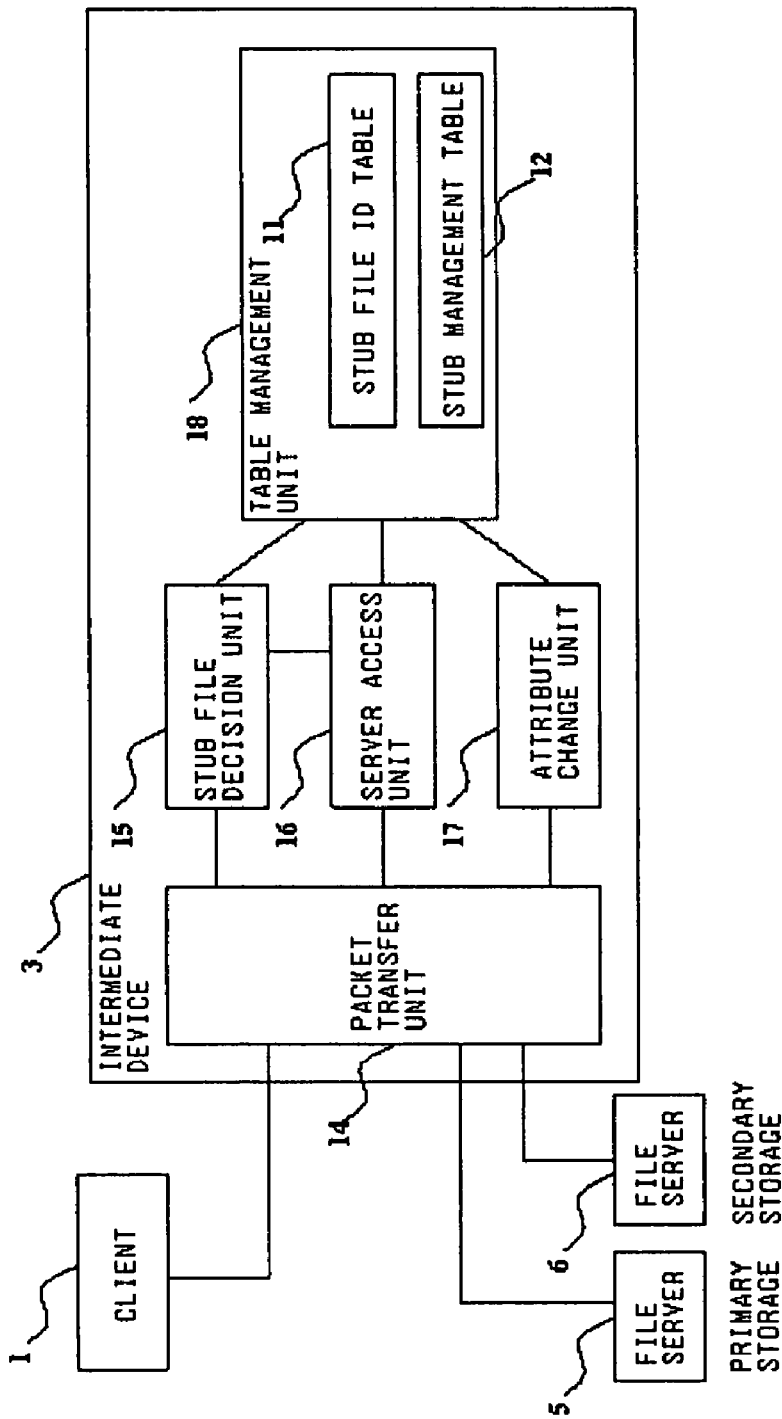
FIG. 17 is a diagram illustrating the configuration of an intermediate device according to an embodiment of the present invention.

FIG. 17 shows an embodiment of an internal structure of the intermediate device 3 described above. Referring to FIG. 17, the intermediate device 3 includes a packet transfer unit 14, a stub file decision unit 15, a server access unit 16, an attribute change unit 17, and a table management unit 18, provided with the stub file ID table 11 and with the stub management table 12, described with reference to FIG. 4. The communication between the client 1 and the file servers 5, 6 is via the packet transfer unit 14. The packet transfer unit 14 supervises the state of the communication packets between the client 1 and the file servers 5, 6 and exchanges the processing between the stub file decision unit 15, server access unit 16 and the attribute change unit 17. The stub file decision unit 15 exercises control of making an enquiry at the table management unit 18 or making a request for the server access unit 16 to access the file server 5. The server access unit 16 accesses the file server 5 for stub file decision or otherwise exercises access control for converting a file into a stub file or vice versa. The decision by the stub file decision unit 15 as to whether or not the file is a stub file is made in accordance with the technique as described in the previous embodiment, including the attribute information or the magic number. The attribute change unit 17 receives a packet from the attribute inform packet transfer unit 14 and makes an enquiry at the table management unit 18 to change the file attribute in the packet.

The above-described embodiment is relevant to a case in which, in a hierarchical storage system where a single real file is present for a sole stub file, the information of the real file, such as a pathname, is stored in the stub file. However, the present invention is not limited to the case of a one-for-one correspondence between a sole stub file and a sole real file. In the following, an embodiment of a system in which the information of plural real files, for example, is stored in a sole stub file, is described. By having the information of plural real files contained in a sole stub file, there may be provided a function distinct from the hierarchical storage system, that is, a new added value.

Moreover, in the above-described embodiment, the intermediate device renders to the client such file services in which plural file servers under its control (file system layers and recording device) appear to be a sole file system. In the following, an embodiment of the system in which file servers are provided at plural bases and in which the client of one of the bases is able to access the file servers of the remaining bases through an intermediate device, will be described. In this embodiment, plural file servers are arranged distributed in plural bases, an intermediate device is arranged for each base, the plural intermediate devices communicate with one another over e.g. a wide area network, and the client of a base is able to access not only a file server of a sole base but also the file servers of the other bases through the intermediate devices of these other bases. It is possible to provide file services in which plural file systems distributed over a wide area are virtualized to render possible such file services in which the client does not have to be conscious of the base where there is the file, that is, the whereabouts of the file.

As a further embodiment of the present invention, it will now be described how the maximum file size may be enlarged with use of the stub file. In e.g. NAS, limitations are imposed on the maximum file system size or the maximum file size, depending on the installed file system layer. In e.g. HPC (High Performance Computing), there is a demand for formulating a file in excess of the above limitations. Thus, the present invention renders it possible to enlarge the maximum size of a file using a stub file.

Figure 18:
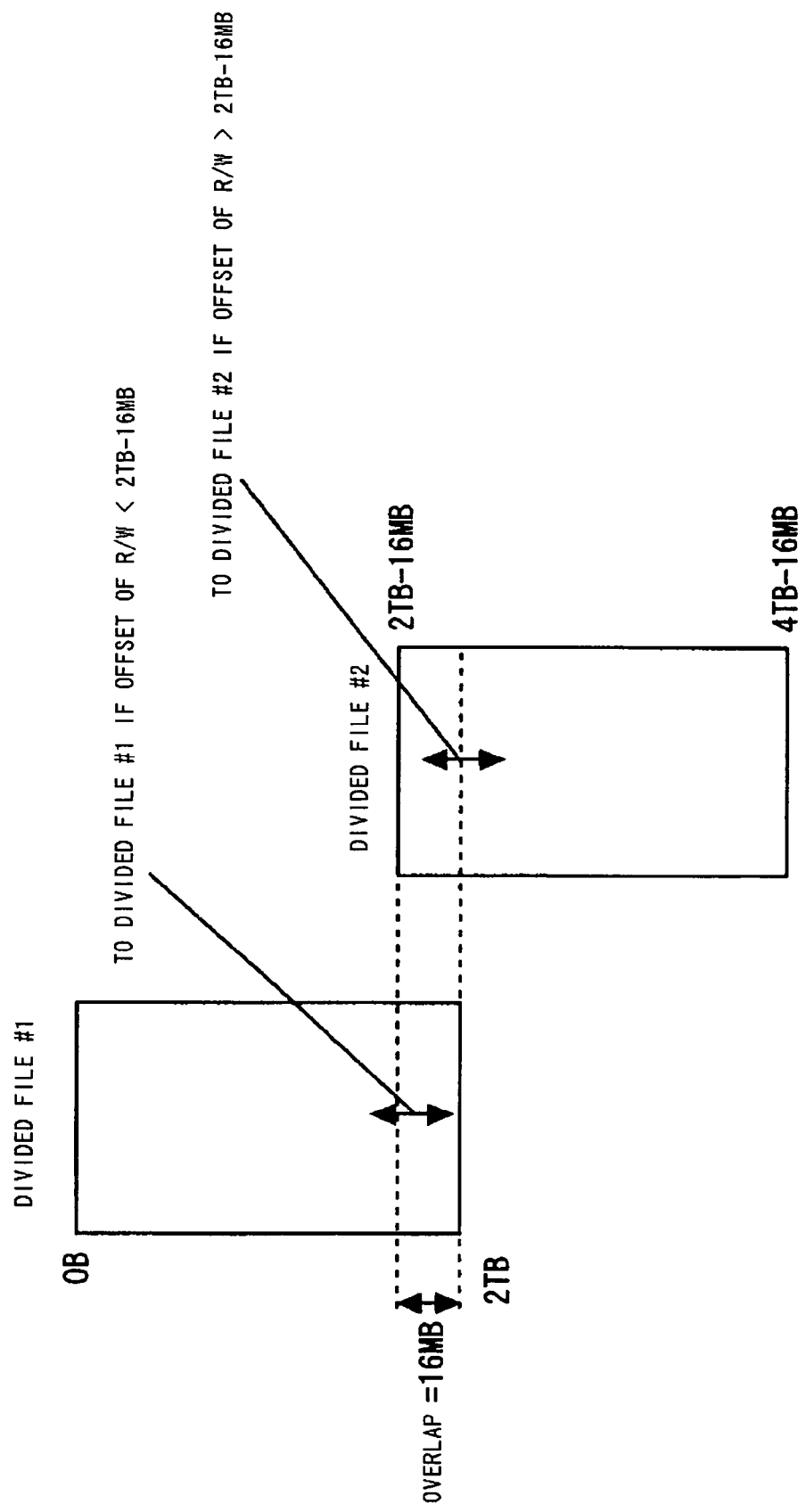
FIG. 18 illustrates enlargement of the maximum file size in another embodiment of the present invention.

FIG. 18 shows a further embodiment of the present invention. Referring to FIG. 18, a sole file is made up by plural divided files (two divided files #1 and #2 in FIG. 18). These two divided files #1 and #2 are provided with overlapped regions. In the case shown in FIG. 18, each divided file is of the size of 2 TB (Tera bytes) corresponding to the maximum size of the NAS, with the file size of the sole file being approximately 4 TB. If the maximum size of the read/write access is 16 MB (Megabyte), 16 MB of the divided file #1, towards the leading end side of the file from the terminal end of its address space of 2 TB, is overlapped with 16 MB of the divided file #2 beginning from its leading end side, thus providing an overlapped area. If, in this case, the read write access is smaller than 2 TB-16 MB, it is the divided file #1 that is accessed and, if the read write access is larger than 2TB-16 MB, it is the divided file #2 that is accessed.

If, in case the overlap area is not provided, the read access address is larger than 2 TB-16 MB, and the divided file #1 is accessed, the amount of read access each time is 16 MB, so that, when the read access is executed, data of the leading area of the next divided file #2 is read. With the present embodiment, if the read access address (leading address) is larger than 2 TB-16 MB, 16 MB is read from a relevant address of the divided file #2. Hence, by providing superposed overlapping areas between neighboring divided files, read astride plural divided files may be prevented from occurring during the execution of a single read write access operation.

Data write in the overlapping regions of the divided files #1 and #2 is synchronized by Dual Call (two callouts of WRITE), or by data write in one of the overlap regions of the divided files #1 and #2 followed by copying, such as to match data of the overlap regions of the divided files #1 and #2. Although there is an overhead, for synchronization, the effect of the overhead is only small because the maximum read/write size of 16 MB is extremely small as compared to the maximum file size of 2 TB.

Figure 19:
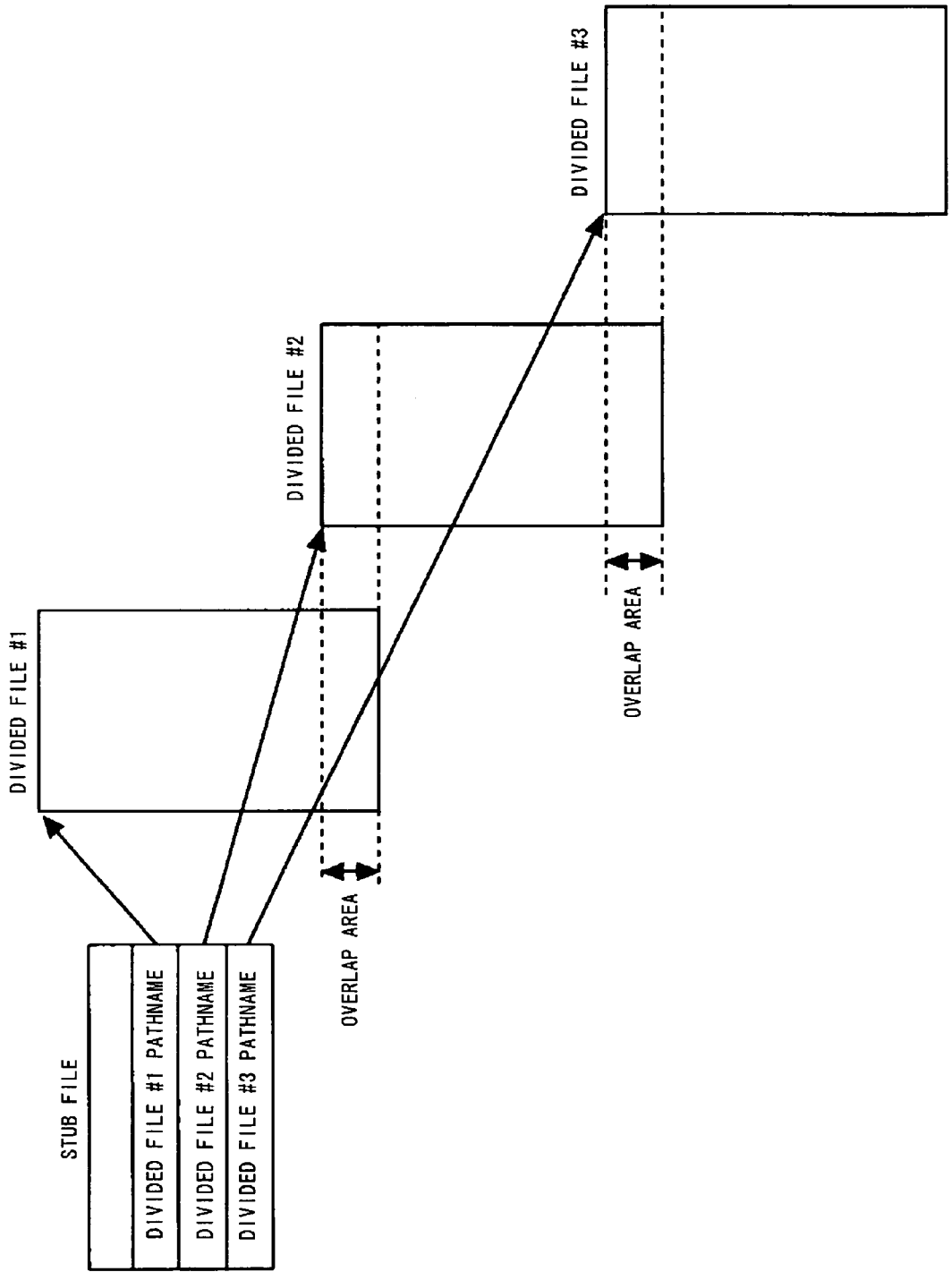
FIG. 19 illustrates enlargement of the maximum file size employing a stub file in another embodiment of the present invention.

The technique of enlarging the maximum file size, using a stub file according to an embodiment of the present invention, will now be described. FIG. 19 illustrates an embodiment of the present invention. As the information to be stored in the stub file, described above, pathnames of plural divided files #1 to #3 are stored in the pathname of the real file. Meanwhile, in the embodiment shown in FIG. 19, overlapping regions are again provided to the neighboring divided files #1 and #2 and to the neighboring divided files #2 and #3.

Figure 20:
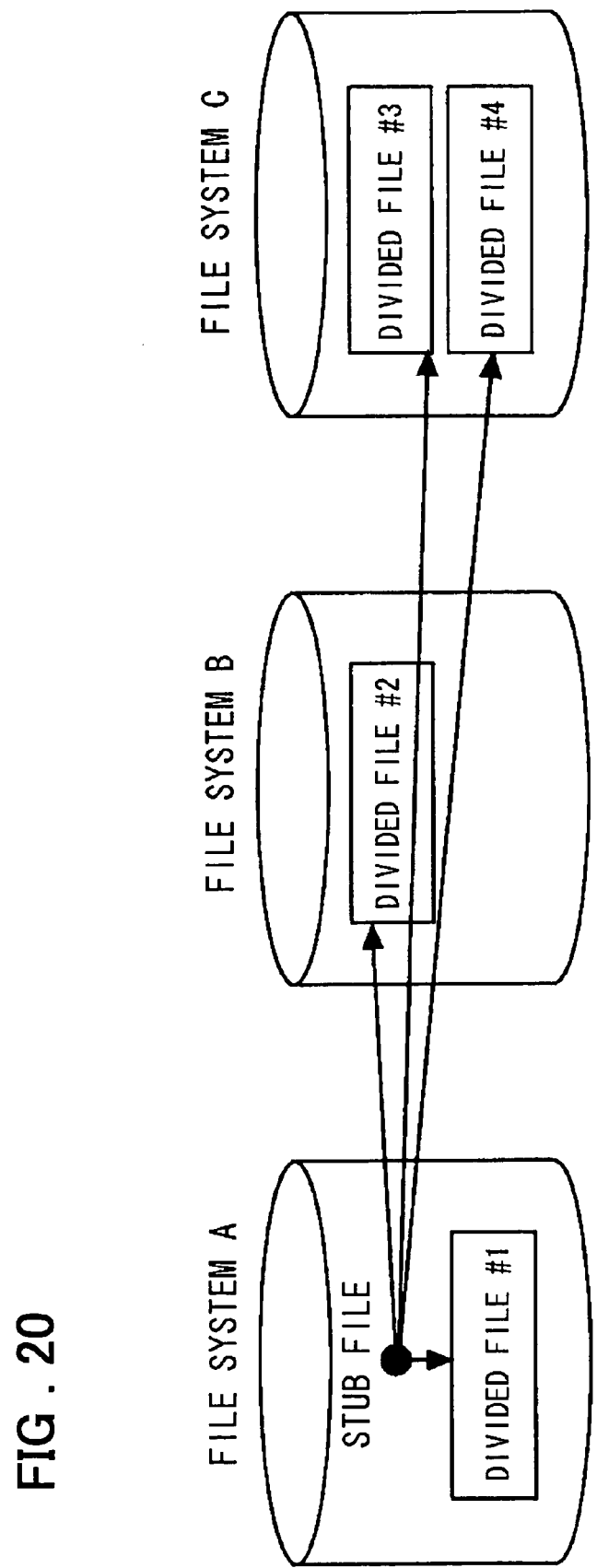
FIG. 20 illustrates the relationship of correspondence between a stub file and divided files in another embodiment of the present invention.

FIG. 20 illustrates an embodiment of the present invention. In case the file size not of the divided files but of the original file exceeds a preset threshold value, the file is stubbed to form a divided file #1. In the present embodiment, the divided file is preferably formed by 'RENAME' (change of name). The divided file #1 is provided in the file system which is the same as the stub file. At the time point of stubbing a file to form a stub file, the file size exceeds 1 TB (Terabyte), such that copying in a separate file system takes much time. In stubbing a file by 'RENAME', copying file data is unneeded. The divided file #2 and next following divided files may be provided in separate file systems.

In the system of the above-described embodiment, the stub file is used in a sole base or in a sole intermediate device. In the following, such a system configuration where stub files are reciprocally referenced among plural intermediate devices, termed below a (reciprocal reference model), will now be described.

Figure 21:
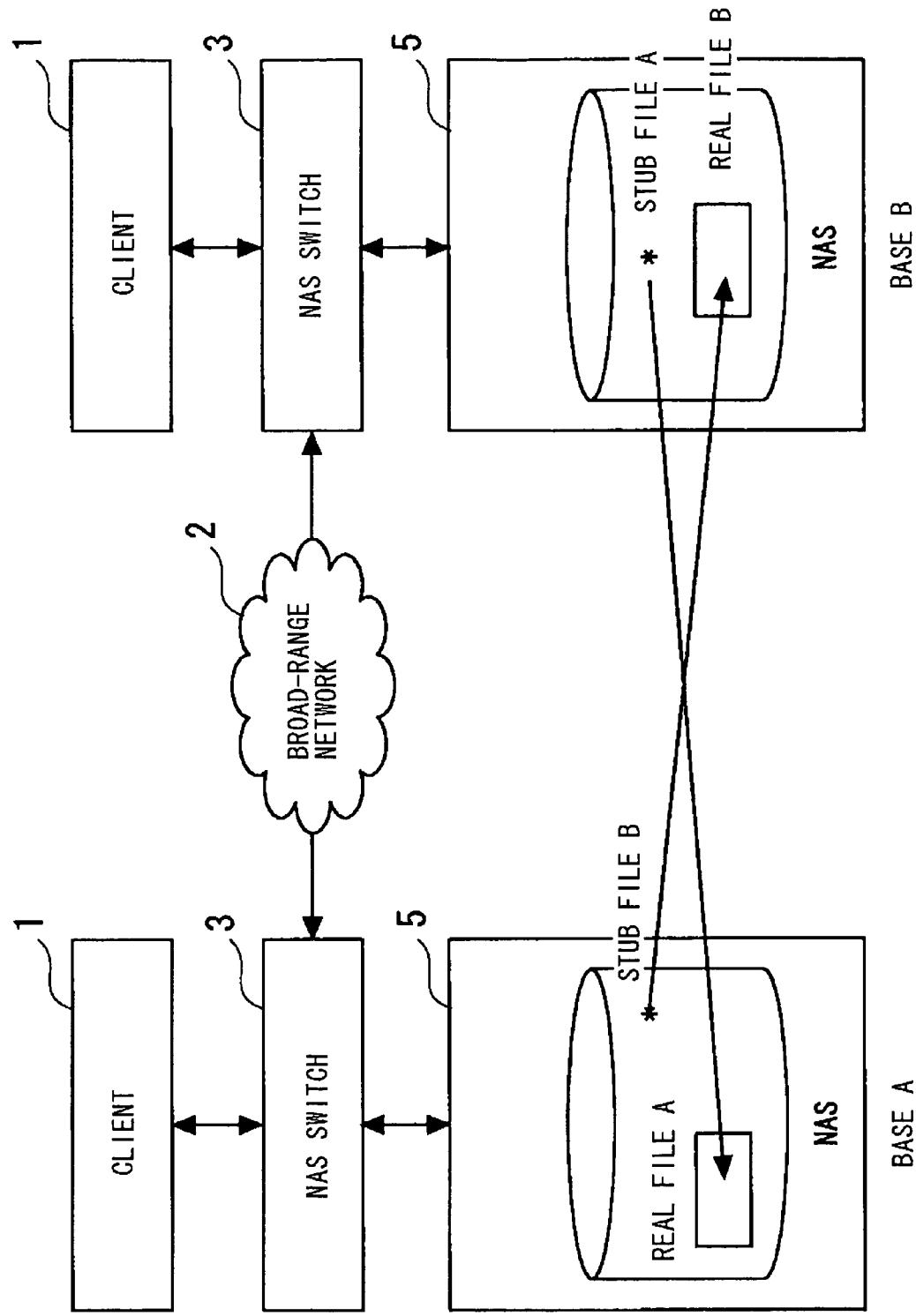
FIG. 21 is a diagram illustrating a reciprocal reference model in a wide area distributed environment in another embodiment of the present invention.

FIG. 21 illustrates the configuration of a modification of the present invention and specifically illustrates the reciprocal reference model. In this figure, two models, each made up by a client 1, a NAS switch (intermediate device) 3 and a NAS (file server) 5, are interconnected via a wide area network 2. A stub file B of a file system of the NAS of a base A references a real file B of a file system of the NAS of a base B, while a stub file A of the file system of the NAS of the base B references a real file A of the file system of the NAS of the base A.

As a manner of arraying a stub file and a real file, data accessed relatively frequently, based on the access context, such as log information of the access frequency, are arranged (localized) in an own file system.

In the case of a file accessed from both the bases A and B, it is the base of the higher access frequency in which is localized the real file. In the instance shown in FIG. 21, the real file A is accessed more frequently from the base A than from the base B, and hence is localized in the base A. The real file B is accessed more frequently from the base B than from the base A, and hence is localized in the base B.

As regards the stub file and the real file, the real file is maintained at all times in the latest sate. Meanwhile, the stub file information may be updated asynchronously or may be maintained at all times in the latest sate.

Next, management of matching for a case the processing is carried out across plural nodes is described. File data matching is maintained using a lock mechanism of the standard protocol. If accessing is made from the stub file side, the stub file and the real file are locked. If, conversely, accessing is made from the real file side, Only the real file is locked.

If, in the present embodiment, update has occurred from the stub file side, matching to real data is to be maintained. If update has occurred from the stub file side, the stub file is updated asynchronously.

Figure 22:
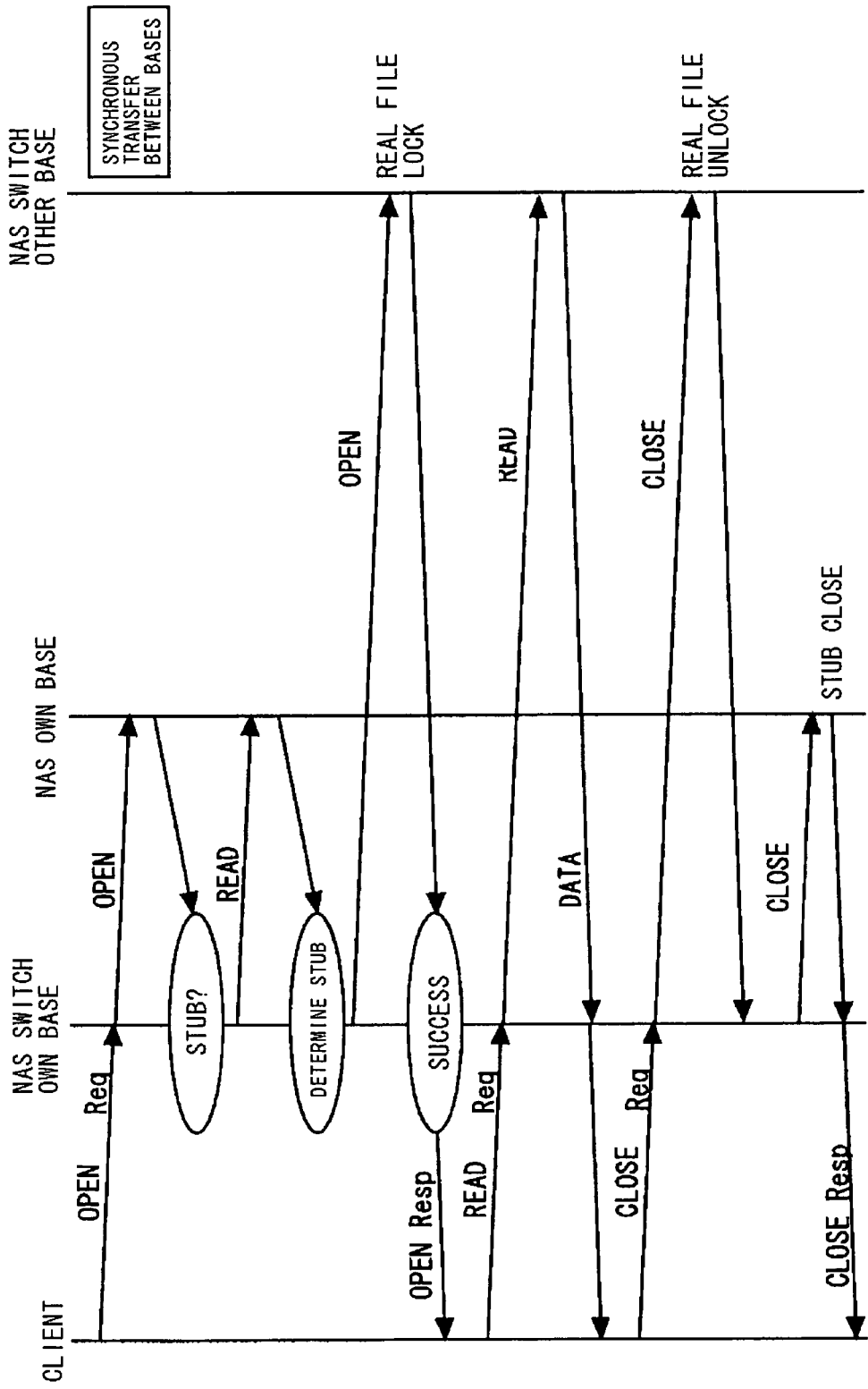
FIG. 22 is a sequential diagram illustrating the READ/WRITE based processing in the distributed wide area environment (stub side).

FIG. 22 shows the processing flow of the read and write system in the distributed system of the plural bases shown in FIG. 21 and specifically depicts a flow sequence diagram showing a sequence of operations for such a case where update has occurred from the stub side. The following explanation is made for an instance where the intermediate device is a NAS (Network Attached Storage) is arranged between another NAS and a client. It is assumed here that the stub is in the NAS of the own base, for example, a base A of FIG. 21, with the real data being in a NAS of the other base, for example, in the NAS of the other base, such as base B of FIG. 21.

Referring to FIG. 22, the client (Client) issues an OPEN request to a NAS switch of the own base. This NAS switch of the own base checks, in accordance with a method for checking as described in the previous embodiment (attribute, file size of a fixed size), whether or not the relevant file of the NAS under its control is a stub file (stub?). If the file in question is the stub file, the NAS switch of the own base reads out the file from the NAS under its control to verify that the file in question is the stub file, based e.g. on the magic number in the leading end of the file, as discussed above (stub determination), to then send an OPEN request to the NAS switch of the other base. In case the real file of the NAS of the other base has been OPENed successfully, the NAS switch of the other base returns a response to the NAS switch of the own base (Resp), while locking the real file of the NAS of the other base (LOCK).

On receipt of the response as to the success of the OPEN request from the NAS switch of the own base, the client sends a READ request to the NAS switch of the own base, which NAS switch of the own base then sends a READ request to the NAS switch of the other base over a broadband network. The NAS switch of the other base sends data (DATA) read from the NAS under its control to the NAS switch of the own base. The NAS switch of the own base sends the read data to the client.

On receipt of the read data, the client sends a CLOSE request to the NAS switch of the own base, which NAS switch then sends a CLOSE request over wide area network to the NAS switch of the other base. This NAS switch of the other base unlocks the real file of the NAS under its control (UNLOCK). The NAS switch of the other base returns a response (Resp) of the CLOSE request to the NAS switch of the own base, which NAS switch of the own base closes the stub of the NAS of the own base (CLOSE) to return the response (CLOSE Resp) to the client. The responses from the NAS switch of the other base to the NAS switch of the own base is sent as synchronous transmission between the two bases.

Figure 23:
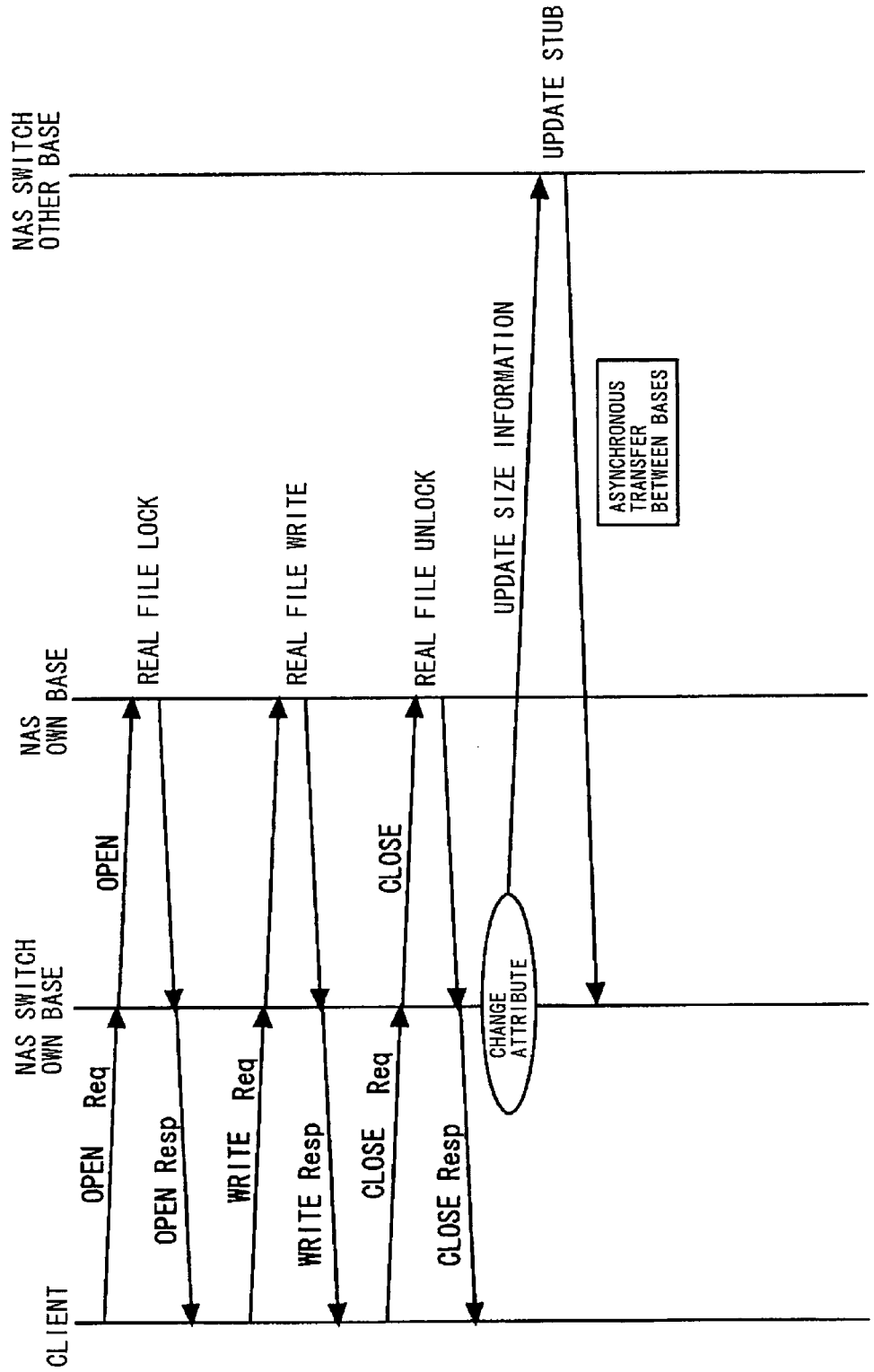
FIG. 23 is a sequential diagram illustrating the READ/WRITE based processing in the distributed wide area environment (real data side).

FIG. 23 depicts the processing flow of the read/write system and represents a sequence diagram showing the sequence in case update has occurred from the real data side. It is assumed that the real data is in the NAS of the own base (base A of FIG. 21) and that the stub is in the NAS of the other base (base B of FIG. 21).

The client issues an OPEN request to the NAS switch of the own base, which NAS switch of the own base opens (OPEN) the file (real file) of the NAS of the own base (LOCK) to return the response (OPEN Resp) to the client.

The client writes data in the real data. That is, the client sends a WRITE request over NAS switch to the NAS within the own base. When writing has come to an end, the client issues a CLOSE request, which is sent via NAS switch to the NAS under its control where the CLOSE processing of the real file is carried out. A response (CLOSEResp) is sent to the client. In case of change in the attribute of the real file by the above WRITE processing (change in the file size), the NAS within the own base sends the size change information to the NAS switch related to the NAS of the other base which has stored the stub file. In the NAS switch of the own base, transmission of the size update information to the NAS switch of the other base is carried out after CLOSE processing by asynchronous transfer between the bases.

The NAS switch of the other base updates the file size information of the real file stored in the stub file in the file system of the NAS under its control and returns a response to the NAS switch of the own base. Meanwhile, in read access, the size information of the real file, for example, is not changed, and hence no request for updating the size information is transmitted.

Figure 24:
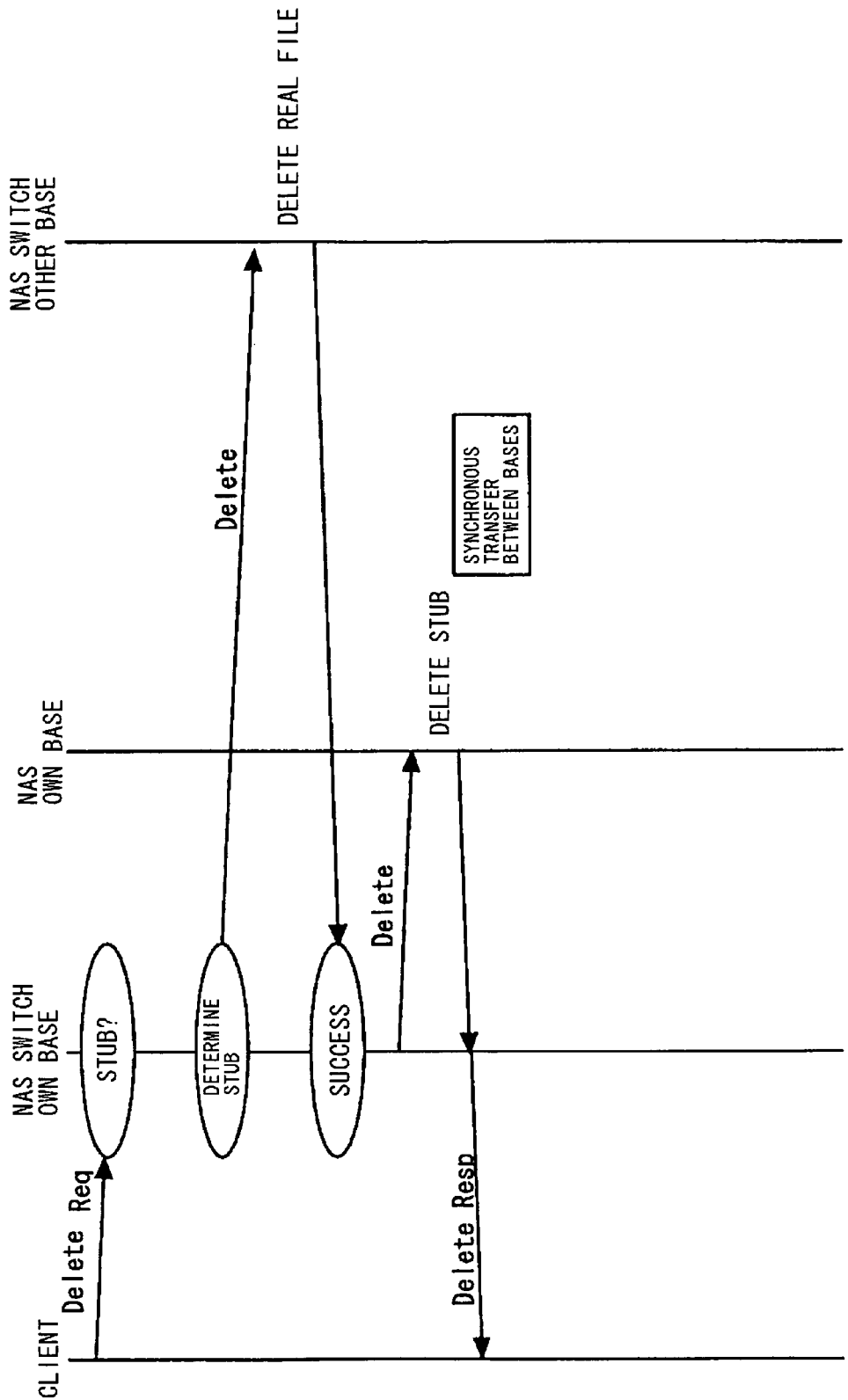
FIG. 24 is a sequential diagram illustrating file system update processing in the b distributed road range environment (stub side).

FIG. 24 shows an example of processing for updating the file system (file deletion or creation) in the present embodiment, and depicts a sequence diagram showing the sequence of operations in case update has originated from the stub side.

In the present embodiment, it is assumed that the stub and the real file are in the NAS of the own base and in the NAS of the other base, respectively.

The client issues a request for deletion (DELETE) to the NAS switch of the own base, which NAS switch then checks whether or not the file in question is the stub. If the file in question is the stub, the request for deletion (DELETE) is sent to the NAS switch of the other base, which NAS switch then sends the request for deletion (DELETE), to the effect that the real file (the pathname of which is specified by stub file) shall be deleted, to the file system of the NAS under its control. The NAS switch of the other base returns the response of deletion of the real file to the NAS switch of the own base. In case of success of the processing for deletion (DELETE), the NAS switch of the own base commands deletion of the stub in the file system of the NAS of the own base, and returns the response to the request for deletion (DELETE Resp) to the client.

The transmission of the request for deletion of the real file from the NAS switch of the own base to the NAS switch of the other base, transmission of the response from the NAS switch of the other base to the NAS switch of the own base, request for deletion (DELETE) to the NAS of the own base and the return of the response, are carried out before returning the response for deletion to the client (synchronous transfer between the bases). It is necessary to determine in advance whether the processing such as formulating a file under a directory or formulating a directory is to be carried out on the stub side or on the real data side.

Figure 25:
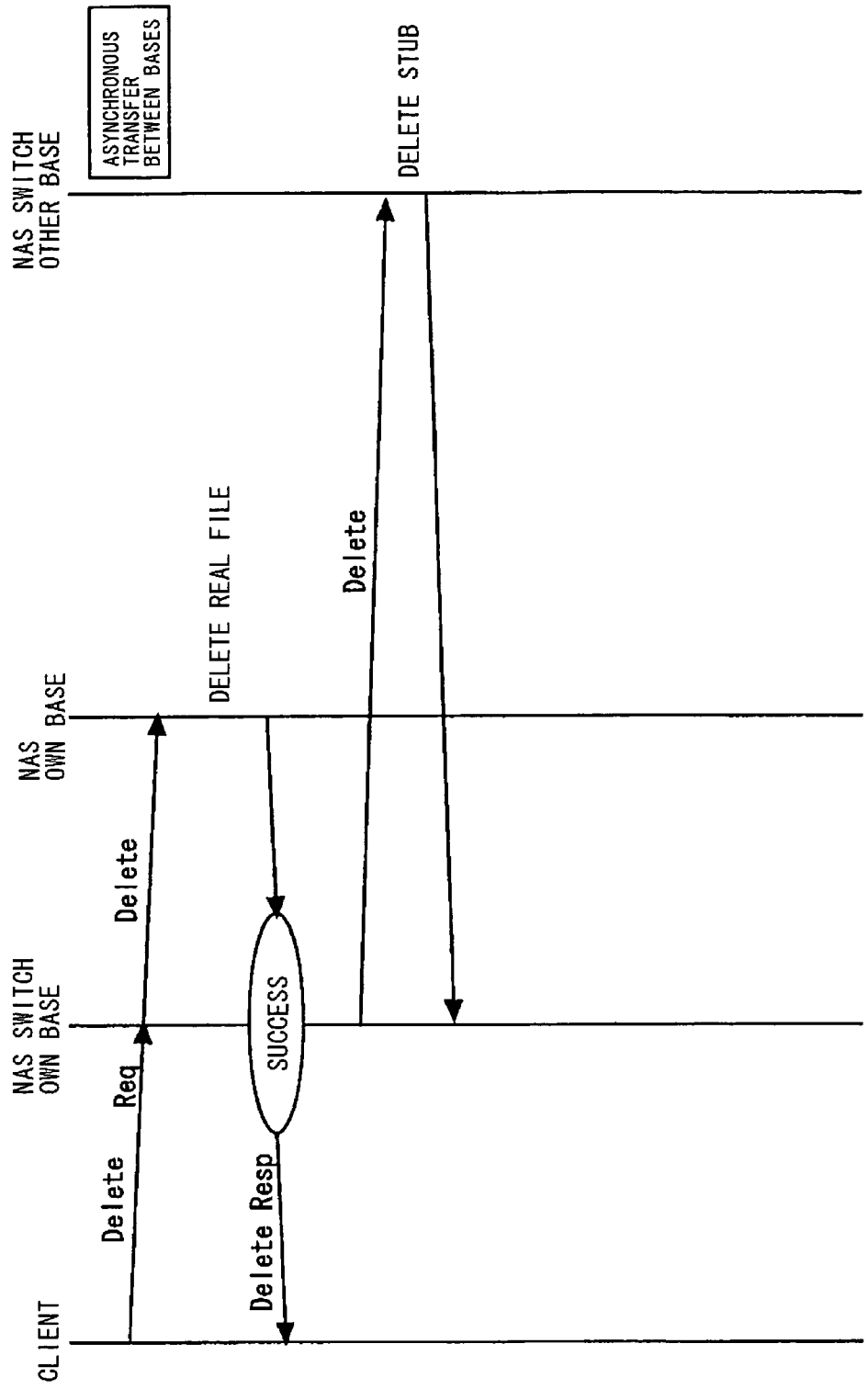
FIG. 25 is a sequential diagram illustrating file system update processing in the distributed wide area environment (real data side).

FIG. 25 shows a different example of processing for updating of the file system (deletion or formulation of files) and depicts a sequence diagram showing the sequence diagram for the sequence of operations in case of an update originating from the real data side. It is assumed that the stub and the real data are in the NAS of the other base and in the NAS of the own base.

The client issues a request for deletion (DELETE) to the NAS switch of the own base. This NAS switch of the own base commands the NAS under its control to delete real data and, if it succeeds in deleting the real file, returns a response to the DELETE request (DELETE Resp) to the client. The NAS switch of the own base then asynchronously transfers a request for stub deletion to the NAS switch of the other base. The response for stub deletion is sent from the NAS switch of the other base to the NAS switch of the own base. It is necessary to determine in advance whether the processing such as formulating a file under a directory or formulating a directory is to be carried out on the stub side or on the real data side.

The system configuration in which there are N (N≧2) bases will now be described. For matching management, confirmation must be made from the totality of bases where real data have been stored. For read/write based processing, read/write access is carried out only when permission from the bases of real data (success of processing for LOCK) and permission of stub files from the stub bases are in order.

For file system update based processing, the success of processing in the bases of the real data is confirmed at all times and thereafter the result of processing is propagated asynchronously to the other bases.

Figure 26:
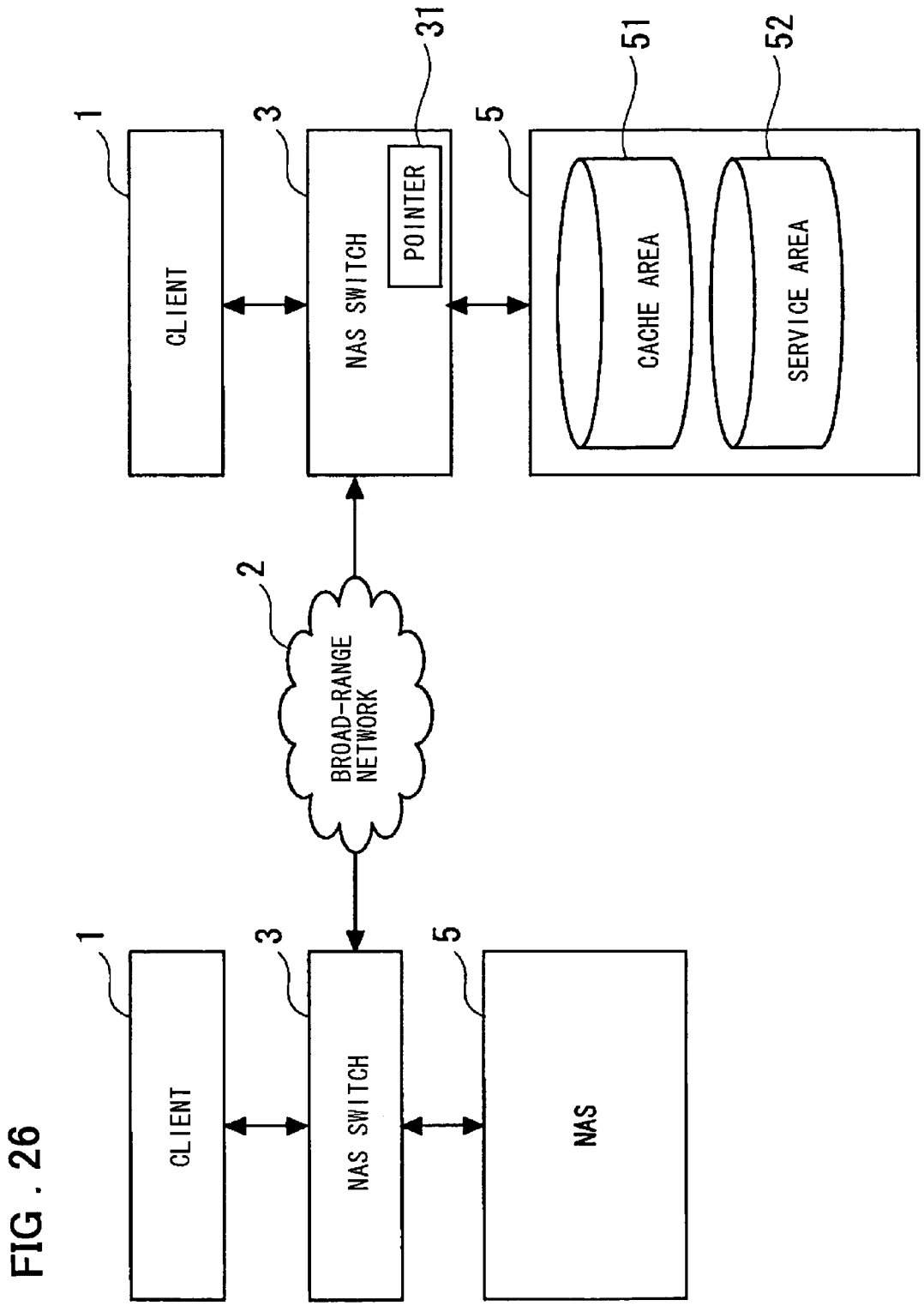
FIG. 26 illustrates caching of a stub file in another embodiment of the present invention.

A further modification of the present invention will now be described. FIG. 26 schematically shows the configuration of a system for caching a stub file. The configuration shown in FIG. 26 caches a real file in at least one base. Each base includes a client 1, a NAS switch 3 and a NAS 5 and the NAS switches of different bases are interconnected by communication over the wide area network 2, such that file access services may be provided in which the clients are not conscious of whether the file access is to the base to which belongs the client or to the other base.

In the present embodiment, if a request for read and update is made from the stub side, data is cached in the stub side base to improve the access performance on the stub side. In the present embodiment, there are provided a READ cache and a WRITE cache.

In the present embodiment, an identifier, operating as a cache pointer, is provided in a stub file. For example, in the stub file format, shown in FIG. 3, an identifier, not shown, operating as a cache pointer, is added between the secondary storage real file pathname 7C and the reserve 7D. In accessing the stubbed data, the data as read is stored in a cache area 51 of the NAS of the own base. The identifier, operating as a pointer 31, is tabulated and stored in a storage area of the NAS switch (intermediate device). For example, the position information of the real file, cached in the cache area 51, may be stored in a stub management table of a stub file ID table, shown in FIG. 4. Meanwhile, a service area 52 of the NAS 5 is a storage area in which to store file data.

If, when access is made to the cached stub file, the identifier of the cache pointer contained in the stub file has been stored as a table in the NAS switch 3, it indicates a cache hit, and data access is made to the local NAS (of the own base) under control of the NAS switch (intermediate base). Meanwhile, the OPEN and the LOCK are carried out on both the stub file side and the real file side.

Figure 27:
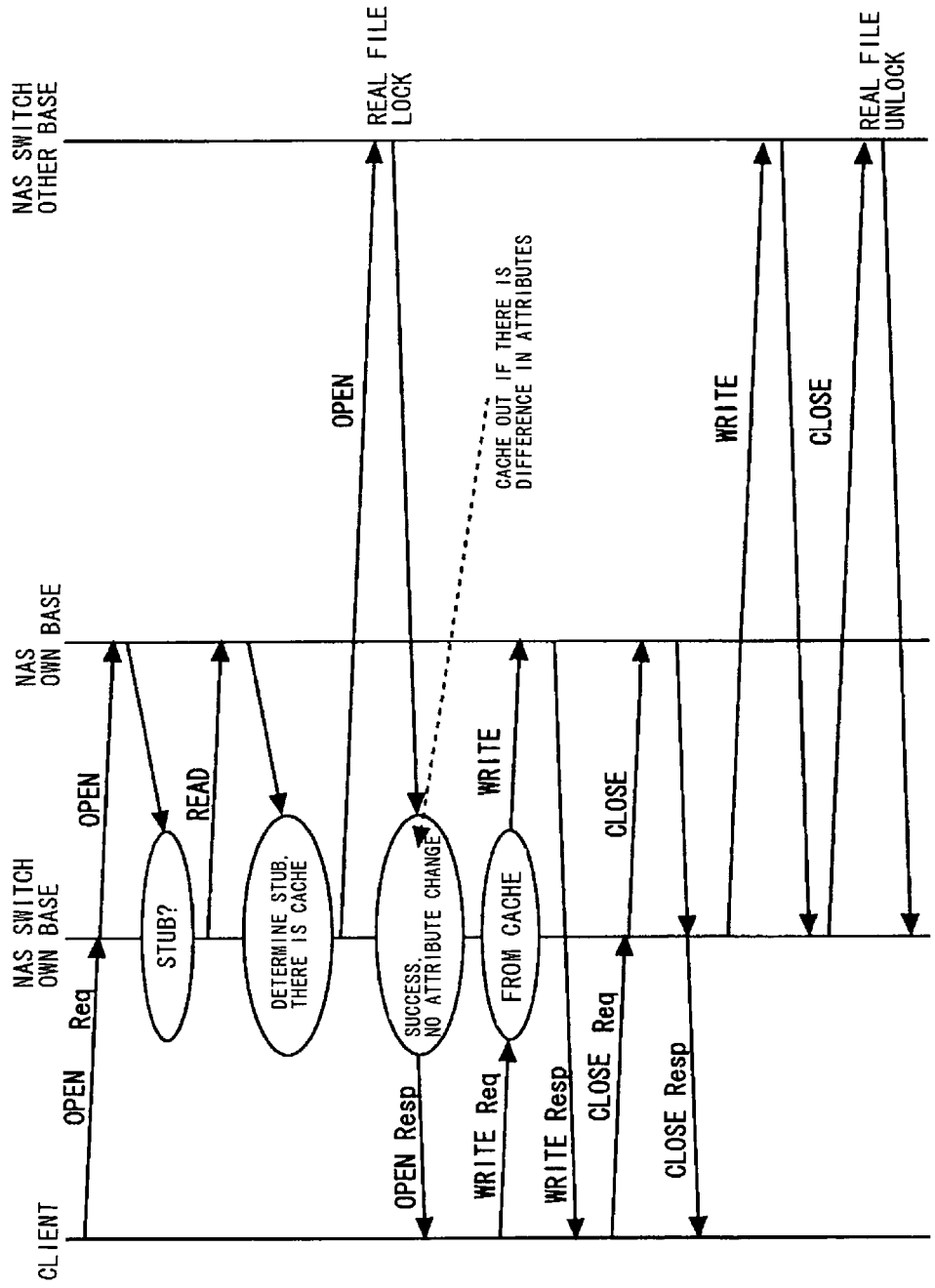
FIG. 27 is a sequential diagram illustrating READ caching in the system of FIG. 26 (stub side).

FIG. 27 depicts a sequence diagram for illustrating the operation of the WRITE caching in the present embodiment. Referring to FIG. 27, the WRITE caching operation of the present embodiment will be described. The client sends an OPEN request to the NAS switch of the own base, which NAS switch of the own base checks whether or not the file in question of the NAS under its control is a stub file. If the file in question is the stub file, the file is read and e.g. the magic number at the leading end of the file is checked to determine whether or not the file in question is the stub file.

If it is confirmed that the file in question is the stub file, and the identifier of the cache pointer included in the stub file has been stored in the storage unit of the NAS switch (31 of FIG. 26), indicating the case of cache hit, the real file of the other base is OPENed, based on the contents of the cached stub file. The NAS switch of the other base locks the real file (LOCK) and sends a response to the OPEN request to the NAS switch of the own base. Since the OPENing processing has met success, and there is no change in the attribute, the NAS switch of the own base returns a response of the OPEN request to the client. If there is a change in the attribute, the stub file is forced out from the cache (cache out).

The client receives a response to the OPEN request from the NAS switch of the own base (OPEN Resp) and sends a WRITE request to the NAS switch of the own base. The NAS switch of the own base writes in the real file cached in the cache area 51, while changing the stub file cached in the NAS switch (change of attribute, such as file size). The NAS switch of the own base then returns a response to the WRITE request (WRITE Resp) to the client.

When the client transmits the CLOSE request to the NAS switch of the own base, the NAS switch of the own base CLOSEs the real file cached in the cache area 51 of the NAS of the own base to return the response (CLOSE Resp) to the client. The NAS of the own base makes a WRITE request to the NAS switch of the other base. The NAS switch of the other base is responsive to the WRITE request to write in the real file of the NAS under its control to maintain data matching (between the data cached in a given base and data of the real file of the other base). The NAS switch of the other base sends a response to the WRITE processing to the NAS switch of the own base. The NAS switch of the own base sends a CLOSE request to the NAS switch of the other base, which NAS switch of the other base unlocks the real file (UNLOCK).

FIG. 28 illustrates the operation of the READ cache. Referring to FIG. 28, the READ cache operation of the present embodiment will be described. The client sends the OPEN request to the NAS switch of the own base, which NAS switch checks whether or not the file in question of the NAS of the own base under its control is the stub file. In case the file in question is the stub file, the file is read and e.g. the magic number in the leading end of the file is checked to decide whether or not the file is the stub file. If the file in question has been found to be a stub file and the identifier of the cache pointer contained in the stub file has been stored in the table of the NAS switch, indicating a case of cache hit, the real file of the other base is OPENed, based on the contents of the cached stub file.

The NAS switch of the other base locks the real file (LOCK) and sends a response to the OPEN request to the NAS switch of the own base. Since the OPENing processing has met success, and there is no change in the attribute, the NAS switch of the own base returns a response of the OPEN request (OPEN Resp) to the client. If there is any change in the attribute, the stub file is from the cache.

The client receives a response to the OPEN request (OPEN Resp) and sends a READ request to the NAS switch of the own base. Based on the contents of the cached stub file, the NAS switch of the own base reads out from the cache area 51 of the NAS of the own base, where has been cached real file data. The NAS switch of the own base returns the response (read data) to the client.

The client sends a CLOSE request to the NAS switch of the own base, which NAS switch of the own base CLOSEs the real file of the NAS of the own base to return the response (CLOSE Resp) to the client.

Subsequently, the NAS switch of the own base sends the CLOSE request to the NAS switch of the other base. This NAS switch of the other base UNLOCKs the real file of the NAS under its control. Thus, by caching the real file of the other base, referenced by the stub file during OPENing, into the own base, it is possible to accelerate the accessing. Meanwhile, if the identifier of the cache pointer is not stored in the storage unit of the NAS switch of a given base (31 of FIG. 26), indicating a mishit, the processing for transferring the real file of the other base to the cache area 51 of the given base is carried out, whereby the identifier of the cache pointer is arranged in a storage unit (table) of the NAS switch, and the accessing processing for the cache described above is carried out.

The foregoing explanation is made for the case of caching the real file of the other base in the cache area of the own base where there is placed the stub file. However, the present invention is naturally not limited to this configuration. For example, the real file of the other base may be cached in a base in the vicinity of the own base where there is the stub file. Or, the real file may be cached in a cache area of such base, if any, which is better in such conditions as communication cost, state of communication or the storage capacity than the aforementioned base where there is put the real file. There are stored in the stub file the information of the real file as cached and the information on the access path to the real file of the other base, such that it is possible to access the real file of the cache area or the real file of the other base from the stub file. On the other hand, the system of caching the real file in the cache area is not limited to the system including plural bases, shown in FIG. 26, and may naturally be applied e.g. to a system including the client, intermediate device and plural file systems.

A further embodiment of the present invention will now be described. As trigger for stubbing/non-stubbing of a file, a threshold value of the storage capacity, a setting value of the quota or commands based on the results of analyses of the access context, such as access frequency.

In the following, an instance of employing a threshold value of the quota will be described. In a file server, there is usually mounted a quota system for limiting the quantity of use of storage resources provided to the device, with the user, group or the directory as a processing unit. The 'quota' means the allocation of the usable quantity. Thus, such control may be exercised by an administrator that data write in quantity cannot be made in excess of a preset storage use limitation. The user administration type quota is managed on the basis of, for example, a user identifier (UID of UNIX (trademark)), and the quota is set in association with the number of files or blocks owned by the user. The group management type quota is managed on the basis of, for example, a group identifier (GID of UNIX (trademark)), and the quota is set in association with the number of files or blocks owned by the group. The directory management type quota is set in association with the number of the files or blocks under the directory. Also, in a well-known manner, the quota may be classed into hard quota and soft quota. With the hard quota, if it is attempted to write in excess of a limit, the result is an error. With the soft quota, write in may be made in excess within a soft limit (preset allowance period) and, if this limit is exceeded, an alarm is issued to the administrator or the user. The quota structure (record) for user management is provided in association with e.g. the user identifier and includes hard and soft limitations of the block, the numbers of the blocks and files currently allocated to the user, and the remainder of the numbers of alarm to the user left until the soft limitations are regulated as hard errors. The quota management functions may be exemplified by the function of setting the subject of limitation of the storage use quantity or the quantity of limitation and the function of acquiring the information pertinent to the use quantity of the storage for the subject as set (rate of use with the amount of limitation as set as an upper limit). The setting and the administration of the quota may use a management interface provided to the file server or the pre-existing NAS.

Although there is placed no particular limitation, decision on stubbing or the control of execution of stubbing in the following embodiment, based on acquisition of the latest storage use quantity of each file system, storage and management of quota setting value in each file system (file server), quantity of use of the storage and the setting value of the quota, is carried out by a NAS switch (intermediate device) connected for communication to the file server.

Figure 29A:
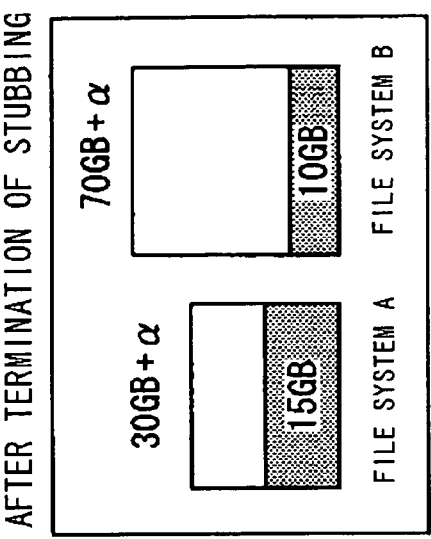
FIGS. 29A, 29B and 29C illustrate stubbing by a quota setting value and the threshold value of the storage quantity in another embodiment of the present invention.
Figure 29B:
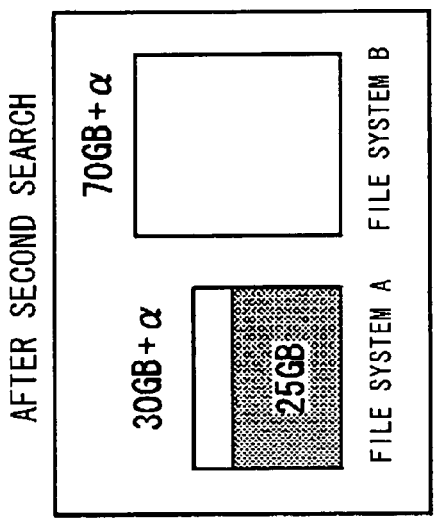
Figure 29C:
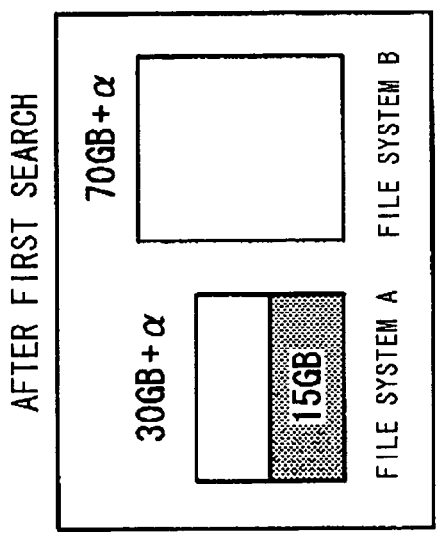

FIGS. 29A, 29B and 29C illustrate an embodiment of the present invention. In a system configuration where the quota setting value of the NAS switch is 100 GB, the hard limit is 100 GB, the soft limit is 100 GB, the file system A is the primary storage and the file system B is the secondary storage, the quota setting for each file system is fixed (hard limit=soft limit). Although there is set no particular limitation, the NAS switch periodically acquires the quota management information of the file systems A and B under its control, and when the use quantity of the primary file system has reached 70 to 90% of the quota setting value, the NAS switch stubs a preset capacity.

Referring to FIG. 29A, the quota setting value of the file system A is set to 30 GB+$\alpha$, where a means the allowance.

The quota setting value of the file system B is set to 70 GB+$\alpha$. The results of the first search indicated that the use quantity of the file system A was 15 GB. It is noted that, in monitoring the storage use quantity in a file server in the intermediate device, the storage use quantity may be acquired by the intermediate device, such as NAS switch (e.g. 3 of FIG. 2) carrying out polling periodically, or the storage use quantity may be notified by e.g. interrupt for the file server to the intermediate device.

If the result of search into the second storage use quantity indicates that the use quantity of the file system A (25 GB) has reached 80% or more of the quota setting value (30 GB+$\alpha$), $\alpha$ being the allowance, 10 GB of the file system A is stubbed, as shown in FIG. 29B. This stubbing is carried out in accordance with the sequence of operations described with reference e.g. to FIG. 13.

The result is that the use quantity of the file system after stubbing 10 GB is equal to 15 GB, the real file is left over in the file system B and the use quantity is 10 GB.

In the present embodiment, decision for file stubbing (e.g. selection of candidates for stubbing) and execution of stubbing (data migration from the primary file system A to the secondary file system B) are controlled automatically by the NAS switch (intermediate device) based on the monitored results of the quota setting value and the storage use quantity of the file system.

That is, in the present embodiment, data migration, such as movement to the real file secondary file system, brought about by stubbing, is hidden from the client via NAS switch (intermediate device). As for details of the technique for hiding data migration, reference may be made to e.g. the description of Patent Document 1. Also, in the present embodiment, the NAS switch (intermediate device) provides file services in which plural file systems may appear to be a sole file system to the client. As for implementation of the function of providing file access services in which plural file systems appear to the client to be a sole pseudo file system (management by a directory tree), see e.g. the description of Patent Document 1.

The above-described control of stubbing based on the above-described storage use quantity may, of course, be applied to a reciprocal reference model of plural bases, described with reference to FIG. 21. In this case, a real file may be placed in a frequently accessed base, while a stub file may be placed in another base, in accordance with the access context information. In the configuration of these plural bases, data migration by stubbing is again hidden from the client.

Although the present invention has been described in the above with reference to certain preferred embodiments, the present invention is not limited to these embodiments but rather may encompass various modifications or corrections that may readily occur to those skilled in the art without departing from the scope of the invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A controller comprising:
   a computer capable of executing software;
   a means for receiving a request for an access to a target file of a first file server when the access request to the target file is issued from a client and for determining whether or not said target file is a stub file on which is recorded position information of a real file moved from said first file server to a second file server, and which is stored in said first file server; and control means for exercising control so that, if said target file is the stub file and said access request necessitates accessing to said real file, said control means accesses said real file of said second file server based on the information of said stub file to return a response to said client from said second file server via said controller, wherein the position information of a plurality of divided files are stored in said stub file and the maximum file size of said target file configured to be enlarged by said stub file associated with said target file, wherein pathnames of a plurality of divided files are stored in said stub file arranged in a storage device and wherein the maximum file size of said target file may be enlarged by said stub file associated with said target file, said plural divided files each include at least a pair of divided files having overlapping regions, wherein said overlapping regions are each set to a value relating to the maximum size of the read/write data volume, wherein said overlapping regions are enlarged to a size equal to or greater than the maximum size of the read/write data volume of the file system, and means for determining that the file size exceeds the maximum file size of said file server by additional writing into the target file, and means for making a second real file, for storing position information of the second real file in the stub file, and for making a stub file after RENAME of this real file in case of absence of the stub file.

2. The controller according to claim 1,
wherein the overlapping regions each correspond to the read/write data volume size at the maximum size so that the access request cannot be astride plural divided files.

3. The controller according to claim 1,
wherein the overlapping regions of each of the pair of divided files is written in a synchronized manner.

* * * * *